(12) United States Patent
Maeda

(10) Patent No.: US 8,543,677 B2
(45) Date of Patent: Sep. 24, 2013

(54) COMMUNICATION CONTROL DEVICE, METHOD, AND COMPUTER READABLE MEDIUM ALLOWING AN INFORMATION PROCESSING DEVICE TO BE IN A POWER SAVING MODE FOR AN EXTENDED PERIOD AND ALLOWING AN APPLICATION PART TO CONTINUE FUNCTIONING

(75) Inventor: Toshihiro Maeda, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 142 days.

(21) Appl. No.: 13/158,492

(22) Filed: Jun. 13, 2011

(65) Prior Publication Data
US 2011/0314311 A1  Dec. 22, 2011

(30) Foreign Application Priority Data

Jun. 21, 2010  (JP) ................................ 2010-140323

(51) Int. Cl.
*G06F 15/16* (2006.01)
*G06F 15/173* (2006.01)

(52) U.S. Cl.
USPC ........................... 709/223; 709/203; 709/224

(58) Field of Classification Search
USPC .................. 709/223–225, 203–206
See application file for complete search history.

(56) References Cited

U.S. PATENT DOCUMENTS

| 7,757,108 | B2 * | 7/2010 | Cheshire | 713/320 |
| 2004/0090650 | A1 * | 5/2004 | Okazawa | 358/1.15 |
| 2007/0124551 | A1 | 5/2007 | Taninaka | |
| 2007/0124617 | A1 | 5/2007 | Takamoto | |
| 2008/0215666 | A1 * | 9/2008 | Kadota | 709/202 |
| 2009/0319700 | A1 * | 12/2009 | Cohn et al. | 710/19 |
| 2013/0024711 | A1 * | 1/2013 | Takamoto | 713/323 |

FOREIGN PATENT DOCUMENTS

| JP | 8-142458 A | 6/1996 |
| JP | 2004-206530 A | 7/2004 |
| JP | 2005-157792 A | 6/2005 |
| JP | 2006-215686 A | 8/2006 |
| JP | 2007-148980 A | 6/2007 |
| JP | 2007-148982 A | 6/2007 |
| JP | 2009-110272 A | 5/2009 |

OTHER PUBLICATIONS

Office Action dated Apr. 24, 2012, issued in corresponding Japanese Patent Application No. 2010-140323, and an English Translation thereof. (6 pages).

* cited by examiner

*Primary Examiner* — Joshua Joo
(74) *Attorney, Agent, or Firm* — Buchanan Ingersoll & Rooney PC

(57) ABSTRACT

A communication control device capable of performing data communication with an information processing device connected through a network, for performing data communication corresponding to a command from an application part which requests data communication with the information processing device, comprises: a communication control part for outputting response information obtained through the data communication corresponding to the command from the application part; and a virtually response part and for generating virtual response information, containing information as to the information processing device, responding to the command from the application part. The communication control part manages registration information including at least one command for requesting virtual data communication performed hypothetically with the virtually response part registered. The communication control part obtains the virtual response information from the virtually response part and outputs to the application part when the command received from the application part is registered in the registration information.

20 Claims, 13 Drawing Sheets

INFORMATION PROCESSING SYSTEM 1

FIG. 6

POWER SAVING SETTING MANAGEMENT INFORMATION 35

| DEVICE NAME | ADDRESS | POWER SAVING SETTING | |
| --- | --- | --- | --- |
| | | SLEEP MODE | ADVANCED SLEEP MODE |
| MFP1 | ###.###.### | ON | ON |
| MFP2 | ###.###.### | ON | ON |
| MFP3 | ###.###.### | OFF | OFF |
| MFP4 | ###.###.### | ON | OFF |

FIG. 7

TABLE INFORMATION 36

| COMMAND | PROTOCOL | NECESSITY OF IMMEDIATE TRANSMISSION | ALTERNATIVE TASK | ACTUAL COMMUNICATION RESTRICTION CONDITION | |
|---|---|---|---|---|---|
| | | | | RESTRICTION OF FREQUENCY (TIME) | TIME RESTRICTION (DAY) |
| CONTINUITY CHECK COMMAND | SOAP/HTTP | NO | ALTERNATIVE TASK A | No | No |
| DEVICE INFORMATION OBTAINING COMMAND | SOAP/HTTP | NO | ALTERNATIVE TASK B | 30 | No |
| SUPPORT COMMAND OBTAINING COMMAND | SOAP/HTTP | NO | ALTERNATIVE TASK C | No | No |
| SEARCH COMMAND | SNMP | NO | ALTERNATIVE TASK D | No | 1 |
| JOB EXECUTION COMMAND | SOAP/HTTP | YES | — | — | — |
| JOB DELETION COMMAND | SOAP/HTTP | YES | — | — | — |
| SETTING CHANGE COMMAND | SOAP/HTTP | YES | — | — | — |

36a: CONTINUITY CHECK COMMAND – SEARCH COMMAND
36b: JOB EXECUTION COMMAND – SETTING CHANGE COMMAND

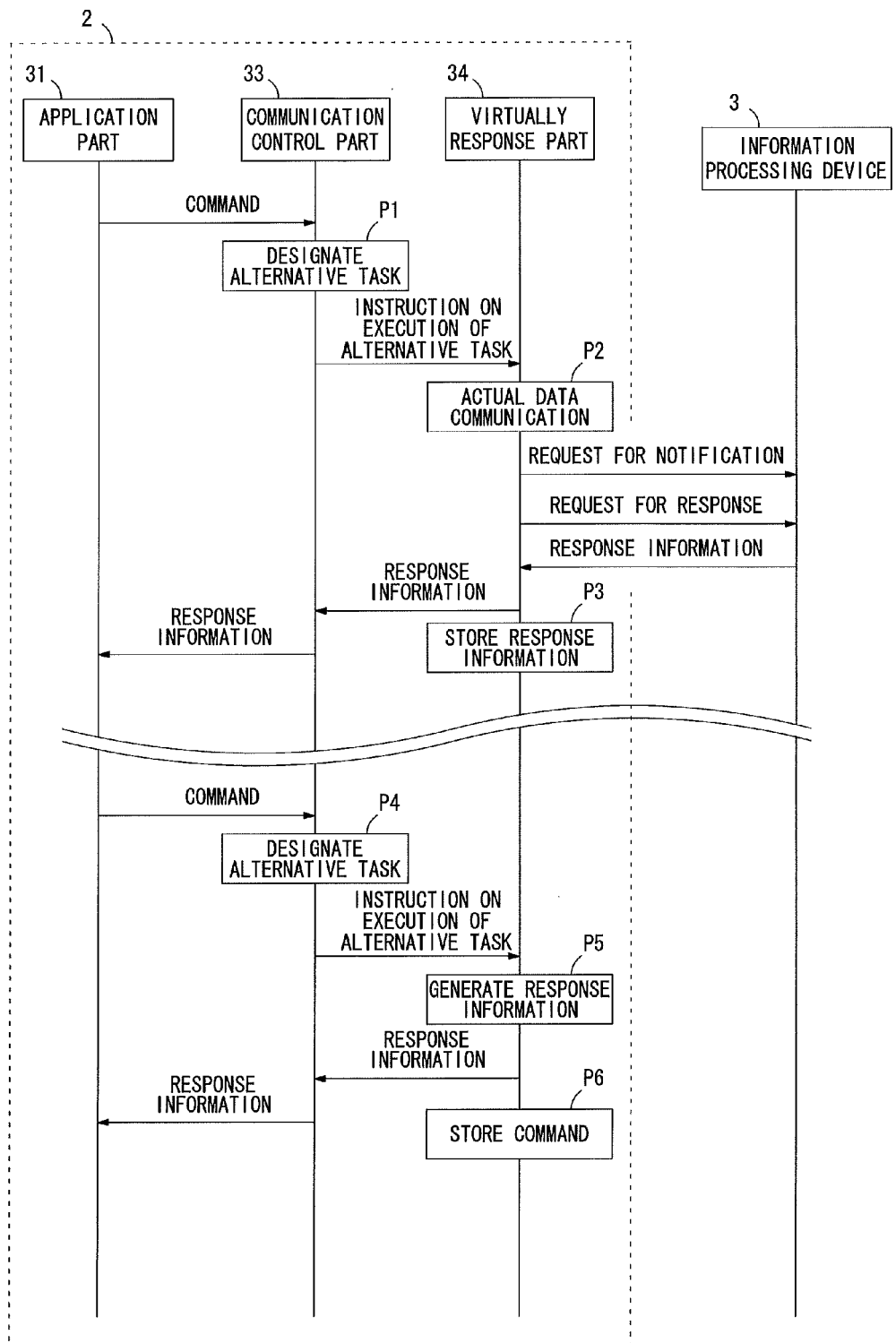

COMMUNICATION CONTROL DEVICE, METHOD, AND COMPUTER READABLE MEDIUM ALLOWING AN INFORMATION PROCESSING DEVICE TO BE IN A POWER SAVING MODE FOR AN EXTENDED PERIOD AND ALLOWING AN APPLICATION PART TO CONTINUE FUNCTIONING

This application is based on the application No. 2010-140323 filed in Japan, the contents of which are hereby incorporated by reference.

BACKGROUND OF THE INVENTION

1. Field of the Invention

The present invention relates to a communication control device, a communication control method, and a computer readable medium. The present invention more specifically relates to a technique of performing data communication with an information processing device through a network.

2. Description of the Background Art

An information processing device called as MFPs (Multi-functional peripherals) executes a job (for example, a copy job) specified by a user in response to an operation by the user to press a start key arranged on its operational panel. As receiving a job (for example, a print job) from a computer including an external computer through the network, the information processing device executes the received job.

After a predetermined period of time elapsed since the last operation made to the operational panel with receipt of no data through the network, some information processing devices cause their operational statuses to enter power saving modes. In the conventional power saving mode, the operational panel is turned off. In recent years, in order to ensure improved advantage of electronic power saving, a CPU, for controlling communications, included in a network communication module is also turned off in addition to the operational panel.

The computer capable of performing data communication with the information processing device through the network stores therein various types of application programs installed. One type of the application programs manages a current status received from the information processing device through data communication with the information processing device on a predetermined periodic basis. This type of application program, however, is started in the computer, and may perform data communication with the information processing device intermittently. The information processing device is then required to turn the CPU of the network communication module on, and needs to exit the power saving mode and revert back to a normal mode. In such a situation, it is difficult for the information processing device to maintain the power saving mode for a long time, hence lowers the advantage of electronic power saving.

In order to prevent the lowered advantage of electronic power saving, in response to receipt of a request for data communication with the information processing device from an application, information to be transmitted to the information processing device is held. It is checked whether or not the information processing device, the destination of the information, is in the power saving mode. For the information processing device in the power saving mode, it is confirmed to the user, prior to the transmission, whether or not to transmit the held information to the information processing device. This known technique is introduced for example in Japanese Patent Application Laid-Open No. JP2009-110272 A. According to the known technique, as the user gives an instruction to transmit the held information to the information processing device, the held information is transmitted to the information processing device. If the user gives an instruction not to transmit the held information to the information processing device, the process is completed without transmitting the held information.

According to the above known technique, the operation in the computer is changed depending on whether or not the information processing device, the destination, is in the power saving mode at time of the receipt of the request for data communication from the application. Thus, a problem that the operational status of the information processing device is necessary to be managed accurately whole time is encountered.

With the known technique, as receiving the request for data communication from the application, the computer holds therein the information to be transmitted to the information processing device when the information processing device is in the power saving mode. If the information processing device in the power saving mode is the destination to which the information is addressed, the computer holds the information including one should be transmitted immediately. The information should be transmitted immediately includes information such as a command to cancel execution of a job already sent and stored in the information processing device or a command to change setting of the information processing device (for example, a command to delete registration information of a registered user), for example.

Therefore, in response to the instruction on transmission to the information processing device by the user, the command requiring immediate transmission is transmitted to the information processing device. The instruction, however, is not always given by the user right after the information is held. The command to cancel the job may be transmitted after the information processing device started execution of the job stored therein. This may cause a delay of the instruction on cancellation of the job. In case of deletion of the registration information of a user registered with the information processing device, the registration information is not deleted in real time. The user who should be restricted the use of the information processing device may be unrestricted the use of the information processing device.

The held information is not transmitted and the process is completed when the user gives the instruction not to transmit the held information to the information processing device. In this case, the information processing device is not caused to exit the power saving mode, hence, helps saving the electronic power. The application sends the request for data communication to obtain some kind of information from the information processing device. However, since the application is not allowed to obtain any response to the request from the information processing device, the application is stopped functioning thereafter.

SUMMARY OF THE INVENTION

The present invention is intended to solve the above problems. Thus, the present invention is intended to provide a communication control device, a communication control method and a computer readable medium capable of allowing an information processing device to be in a power saving mode for a long time with preventing an application part from being stopped functioning. The communication control device, the communication control method and the computer readable medium are also capable of allowing the information processing device to execute an appropriate process in real time.

First, the present invention is directed to a communication control device capable of performing data communication with an information processing device connected through a network. The communication control device performs data communication corresponding to a command from an application part which requests data communication with the information processing device.

According to one aspect of the communication control device, the communication control device, comprises: a communication control part for performing data communication corresponding to the command from the application part and for outputting response information obtained through the data communication to the application part; and a virtually response part for storing information received from the information processing device and for generating virtual response information, containing information as to the information processing device, responding to the command from the application part. The communication control part manages registration information including at least one command for requesting virtual data communication performed hypothetically with the virtually response part registered. The communication control part obtains the virtual response information through the virtual data communication with the virtually response part and outputs the obtained virtual response information to the application part when the command received from the application part is registered in the registration information, while obtaining the response information through actual data communication with the information processing device and outputting the obtained response information to the application part when the command received from the application part is not registered in the registration information.

Second, the present invention is directed to a communication control method for controlling communication corresponding to a command from an application part which requests data communication with an information processing device connected through a network.

According to one aspect of the communication control method, the communication control method, comprises the steps of: (a) receiving, from the application part, the command requesting the data communication with the information processing device; (b) determining whether or not the command defined to perform virtual data communication with a predetermined virtually response part included in a command list is received from the application part; and (c) obtaining, through the virtual data communication with the virtually response part, virtual response information from the virtually response part and outputting the obtained virtual response information to the application part when the command received from the application part is included in the command list, while obtaining, through actual data communication with the information processing device, response information from the information processing device and outputting the obtained response information to the application part when the command received from the application part is not included in the command list.

Third, the present invention is directed to a computer readable medium on which a program is recorded. The program is executed by a computer which performs data communication with an information processing device connected through a network.

According to an aspect of the computer readable medium, the program recorded on the medium causes the information processing device to execute the steps of: (a) receiving, from the application part, the command requesting the data communication with the information processing device; (b) determining whether or not the command defined to perform virtual data communication with a predetermined virtually response part included in a command list is received from the application part; and (c) obtaining, through the virtual data communication with the virtually response part, virtual response information from the virtually response part and outputting the obtained virtual response information to the application part when the command received from the application part is included in the command list, while obtaining, through actual data communication with the information processing device, response information from the information processing device and outputting the obtained response information to the application part when the command received from the application part is not included in the command list.

Fourth, the present invention is directed to a computer readable medium on which a program is recorded. The program is executed by a computer which performs data communication with an information processing device connected through a network.

According to an aspect of the computer readable medium, the program causes the computer to operate as a system comprising: a communication control part for performing data communication corresponding to the command from the application part, which requests data communication with the information processing device and for outputting response information obtained through the data communication to the application part; and a virtually response part for storing information received from the information processing device and for generating virtual response information, containing information as to the information processing device, responding to the command from the application part. The communication control part manages registration information including at least one command for requesting virtual data communication performed hypothetically with the virtually response part registered. The communication control part obtains the virtual response information through the virtual data communication with the virtually response part and outputs the obtained virtual response information to the application part when the command received from the application part is registered in the registration information, while obtaining the response information through actual data communication with the information processing device and outputting the obtained response information to the application part when the command received from the application part is not registered in the registration information.

BRIEF DESCRIPTION OF THE DRAWINGS

FIG. 6 shows an example of power saving setting management information managed by an application management device;

FIG. 7 shows an example of table information managed by the application management device;

FIG. 8 shows an example of data communication performed when a command not requiring immediate transmission is received from an application part;

DESCRIPTION OF THE PRESENT PREFERRED EMBODIMENTS

Figure 1:
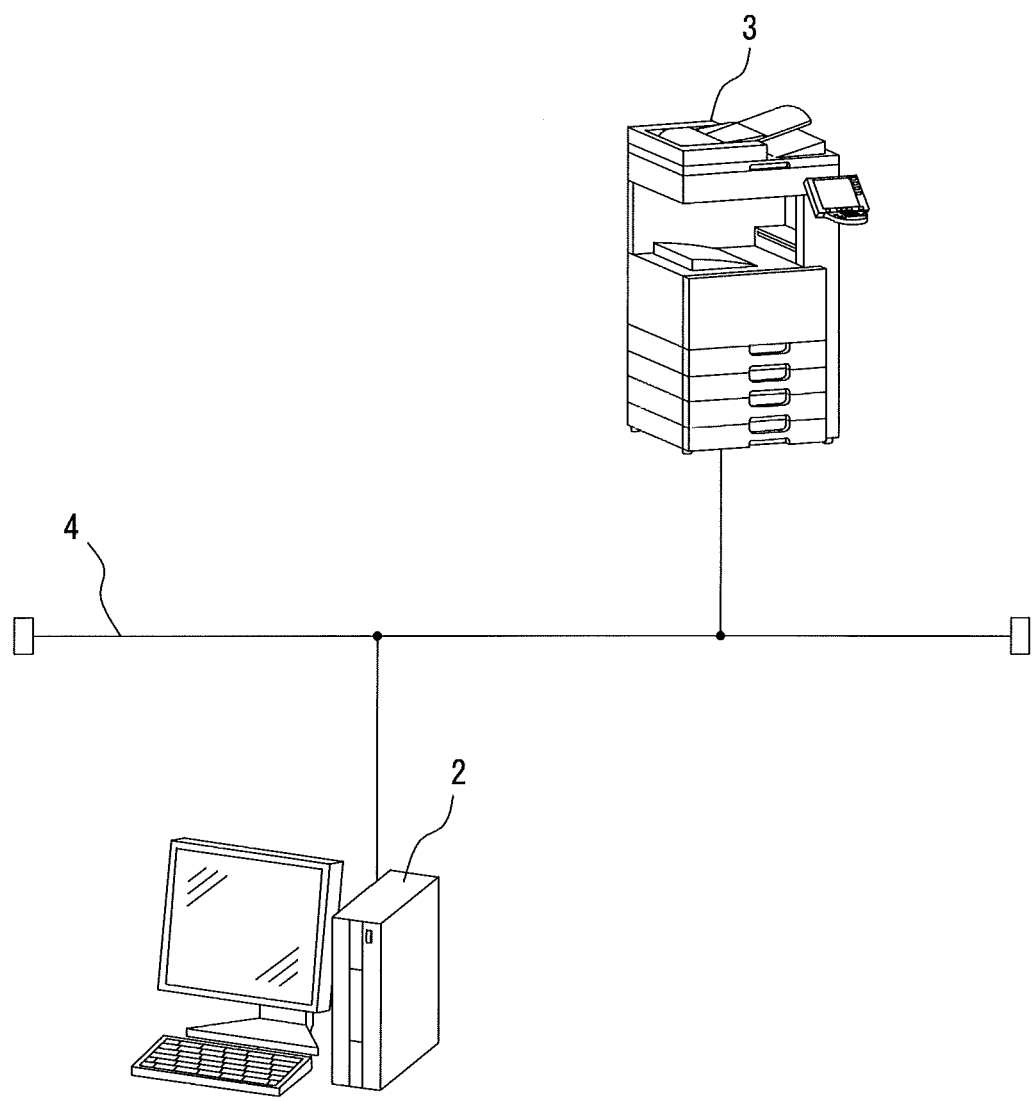
FIG. 1 shows an exemplary configuration of an information processing system of a preferred embodiment of a present invention.

A present preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an information processing system 1 of the preferred embodiment of the present invention. The information processing system 1 includes a computer 2 formed from a generally-used personal computer (PC) and an information processing device 3 called by a name such as MFPs. These components are connected to each other through a network 4 including a LAN in a manner that allows data communication therebetween. The information processing device 3 executes a variety of jobs corresponding to at least one function selected by a user from multiple functions such as a copy function, a print function, a fax function, a scan function and a box function thereof. The network 4 is not necessarily a wired LAN, and it may be configured to include a wireless LAN or other networks. In FIG. 1, one information processing device 3 is connected to the network 4. The plurality of information processing devices 3 or devices other than the above-described device may also be connected to the network 4.

Figure 2:
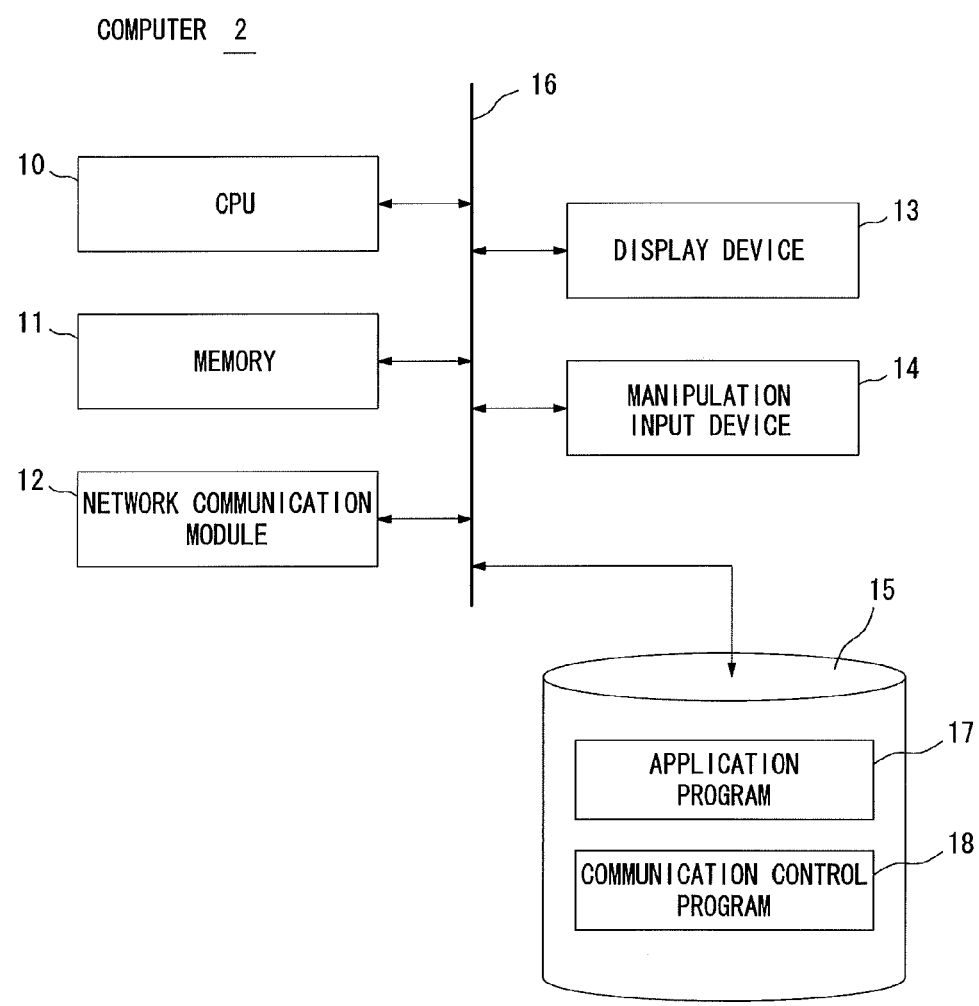
FIG. 2 is a block diagram showing the hardware configuration of a computer.

FIG. 2 is a block diagram showing the hardware configuration of the computer 2. The computer 2 includes a CPU 10, a memory 11, a network communication module 12, a display device 13, a manipulation input device 14 and a storage device 15 that are connected to each other to allow data input and output between these parts through a data bus 16.

The CPU 10 executes various types of programs. The memory 11 stores therein data such as temporary data required in accordance with execution of the program by the CPU 10. The network communication module 12 performs data communication with each device through the network 4 with execution of each program by the CPU 10. The display device 13, on which various types of information are displayed, is formed from a device such as a liquid crystal display. The manipulation input device 14 is configured with a device including a keyboard and a mouse, and receives a variety of operations for instructions made by the user.

The storage device 15 is formed from a nonvolatile storage device such as a hard disk drive. The storage device 15 stores therein an application program 17 and a communication control program 18 installed in advance. The storage device 15 also stores therein an operating system (OS) not shown in FIG. 2 installed in advance.

The CPU 10 boots the operating system installed on the storage device 15 when the computer 2 is turned on. The CPU 10 then reads and boots the communication control program 18. As the computer 2 is turned on, the communication control program 18 is automatically executed by the CPU 10. The communication control program 18 is booted and resident in the computer 2 unless the computer 2 is turned off. The communication control program 18 booted by the CPU 10 becomes operative to function as the communication control device which controls data communication with the information processing device 3 via the network communication module 12.

In response to an instruction on execution by the user, for example, the application program 17 is read and executed by the CPU 10. The application program 17 like the communication control program 18 may be executed automatically as the computer 2 is turned on. The application program 17 manages the information processing device 3. To be more specific, the application program 17 is executed by the CPU 10, thereby realizing functions of managing the status of the information processing device 3, transmitting a job to the information processing device 3, cancelling the job transmitted to the information processing device 3 or changing setting of the information processing device 3.

Figure 3:
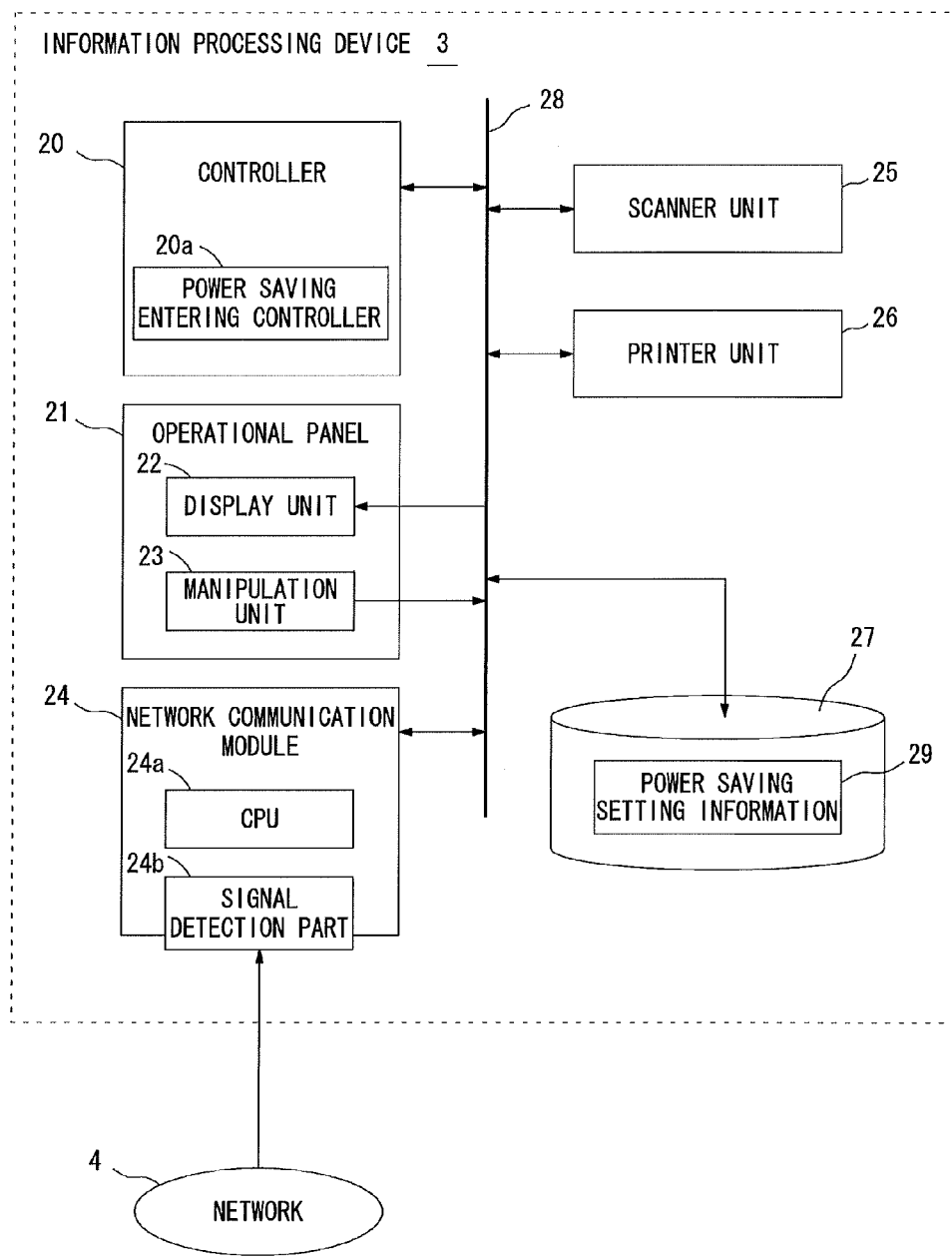
FIG. 3 is a block diagram showing the hardware configuration of an information processing device.

FIG. 3 is a block diagram showing the hardware configuration of the information processing device 3. The information processing device 3 includes a controller 20, an operational panel 21, a network communication module 24, a scanner unit 25, a printer unit 26 and a storage device 27 that are connected to each other to allow data input and output between these parts through a data bus 28.

The controller 20 including a CPU and a memory controls each part by execution of a predetermined program by the CPU. The CPU and the memory are not shown in FIG. 3. The controller 20 also includes a power saving entering controller 20a. The operational panel 21 is a user interface for the user in use of the information processing device 3. The operational panel 21 includes a display unit 22 on which various types of information are displayed and a manipulation unit 23 which receives a variety of operations for instructions made by the user. The network communication module 24 receives data addressed to the information processing device 3 through the network 4 and outputs to the controller 20, and obtains data addressed to the computer 2 from the controller 20 and transmits the data through the network 4. The network communication module 24 includes a CPU 24a processes data transmitted and received through the network 4 and a signal detection part 24b detects data addressed to the information processing device 3 and receives the data through the network 4.

The scanner unit 25 becomes operative in response to execution of, for example, a job including a copy job, a scan job and a fax transmission job in the information processing device 3. The scanner unit 25 reads an image of an original and generates image data. The printer unit 26, for forming image on a paper sheet based on the image data and producing a printed matter, becomes operative in response to execution of, for example, a job including a copy job, a print job and a fax receipt job in the information processing device 3. The storage device 27, formed from a nonvolatile storage device such as a hard disk drive, stores therein power saving setting information 29 configured in advance by the user. The storage device 27 is also capable of storing therein unexecuted jobs.

As the above-described information processing device 3 is turned on, the controller 20 executes the predetermined program, and causes an operational status of the information processing device 3 to enter a normal mode. The information processing device 3 in the normal mode waits for an input of the instruction on execution of a job, so each of the above-described parts of which consumes power supplied thereto. The user, for example, gives the instruction on execution of a job such as a copy job by making operation to the manipulation unit 23 of the operational panel 32 while the information processing device 3 is in the normal mode. In this case, the controller 20 puts the scanner unit 25 and the printer unit 26 into operation, thereby controlling execution of the job specified by the user. As the information processing device 3 in the normal mode receives a job execution command of a job such as a print job through the network 4 via the network communication module 24, the controller 20 controls, with putting the printer unit 26 into operation, execution of the job such as the print job specified by the job execution command.

Figure 4:
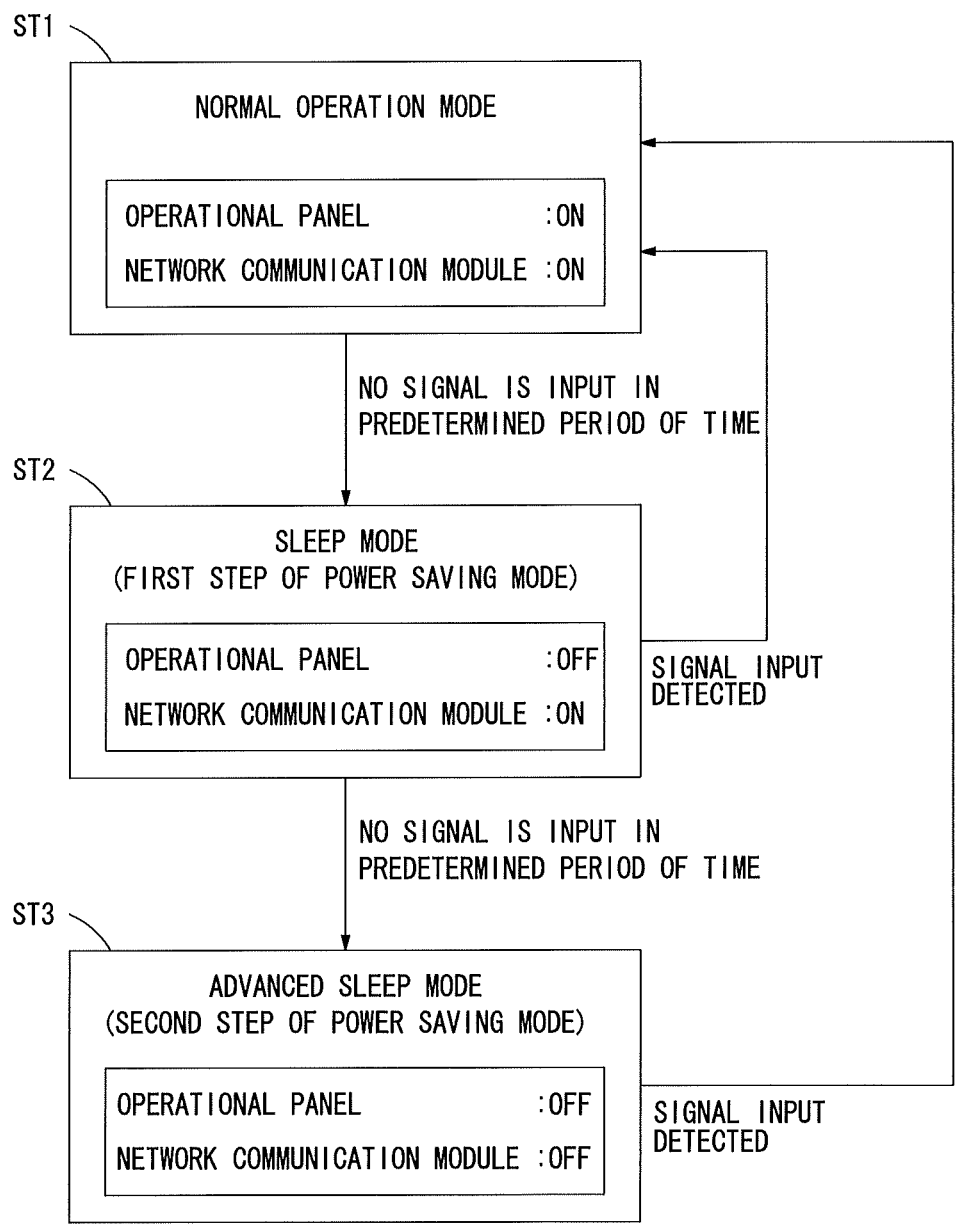
FIG. 4 shows transition of an operational status of the information processing device.

The power saving entering controller 20a of the controller 20 causes the operational status of the information processing device 3 to enter a sleep mode which is one type of the power saving modes from the normal mode based on a predetermined condition. FIG. 4 shows transition of the operational status of the information processing device 3. As shown in FIG. 4, the power saving entering controller 20a places the operational status of the information processing device 3 in one of three modes, a normal operation mode ST1, a sleep mode ST2 and an advanced sleep mode ST3. The sleep mode ST2 to be the first step of the power saving mode is capable of reducing consumed electricity supplied to the information processing device 3 in the normal mode ST1. The sleep mode ST3 to be the second step of the power saving mode is capable of reducing larger amount of consumed electricity than the sleep mode ST2.

As being turned on, the information processing device 3 is entered the normal mode ST1 by the power saving entering controller 20a. The information processing device 3 in the normal mode ST1 waits for the input of the instruction on execution of a job with each part to which the electricity is supplied. The power saving entering controller 20a monitors the manipulation unit 23 of the operational panel 21 and the signal detection part 24b of the network communication module 24. In some cases, no signal is detected by either of the manipulation unit 23 or the signal detection part 24b of the information processing device 3 in the normal mode ST1, and the predetermined period of time elapses. In such a case, the power saving entering controller 20a places the operational status of the information processing device 3 from the normal mode ST1 into the sleep mode ST2. For this time, the power saving entering controller 20a turns off the display unit 22 of the operational panel 21 to turn off a light of the operational panel 21. As the input of the signal is detected by either of the manipulation unit 23 or the signal detection part 24b of the information processing device 3 in the sleep mode ST2, the operational status of the information processing device 3 is then reverted back from the sleep mode ST2 to the normal mode ST1 by the power saving entering controller 20a to be capable of executing the job.

As no signal is detected by either of the manipulation unit 23 or the signal detection part 24b of the information processing device 3 in the sleep mode ST2 and the predetermined period of time elapses, the power saving entering controller 20a places the operational status of the information processing device 3 from the sleep mode ST2 into the advanced sleep mode ST3. For this time, the power saving entering controller 20a turns off not only the display unit 22 of the operational panel 21 but also the CPU 24a of the network communication module 24, whereas the signal detection part 24b is kept functioning. The number of the parts consuming electricity in the information processing device 3 in the advanced sleep mode ST3 is less than the one in the information processing device 3 in the sleep mode ST2. This may lead to an increased power saving effect.

As the input of the signal is detected by either of the manipulation unit 23 or the signal detection part 24b of the information processing device 3 in the advanced sleep mode ST3, the operational status of the information processing device 3 is reverted back from the advanced sleep mode ST3 to the normal mode ST1 by the power saving entering controller 20a. The information processing device 3 is capable of executing the job then. The information processing device 3 placed in the sleep mode ST2 or the advanced sleep mode ST3 exits the power saving mode and is reverted back to the normal mode ST1 in response to receipt of any kind of command from the computer 2.

The operational status of the information processing device 3 may be placed in one of the three modes, the normal mode ST1, the sleep mode ST2 and the advanced sleep mode ST3. The user may set in advance whether or not to allow the operational status of the information processing device 3 to enter the sleep mode ST2 from the normal mode ST1, or to enter the advanced sleep mode ST3 from the sleep mode ST2. The setting of this kind is registered in the power saving setting information 29. The power saving entering controller 20a reads the power saving setting information 29 in the storage device 27, and controls the operational status of the information processing device 3 to enter which one of the modes based on the read power saving setting information 29. It is assumed, for example, that information set to allow the operational status to enter the sleep mode ST2 is included in the power saving setting information 29. In this case, the operational status of the information processing device 3 is placed from the normal mode ST1 into the sleep mode ST2 unless the input of the signal is detected for the predetermined period of time as described above. It is further assumed, for example, that information set to allow the operational status to enter the advanced sleep mode ST3 is included in the power saving setting information 29. In such a case, the operational status of the information processing device 3 is placed from the sleep mode ST2 into the advanced sleep mode ST3 unless the input of the signal is detected for the predetermined period of time as described above. If information set not to allow the operational status to enter the sleep mode ST2 is included, the information processing device 3 keeps operating in the normal mode ST1 full-time without entering another mode as stated above. The power saving setting information 29 sometimes includes information set to allow the operational status to enter the sleep mode ST2 and not to enter the advanced sleep mode ST3. The information processing device 3 is then only placed from the normal mode ST1 into the sleep mode ST2.

Figure 5:
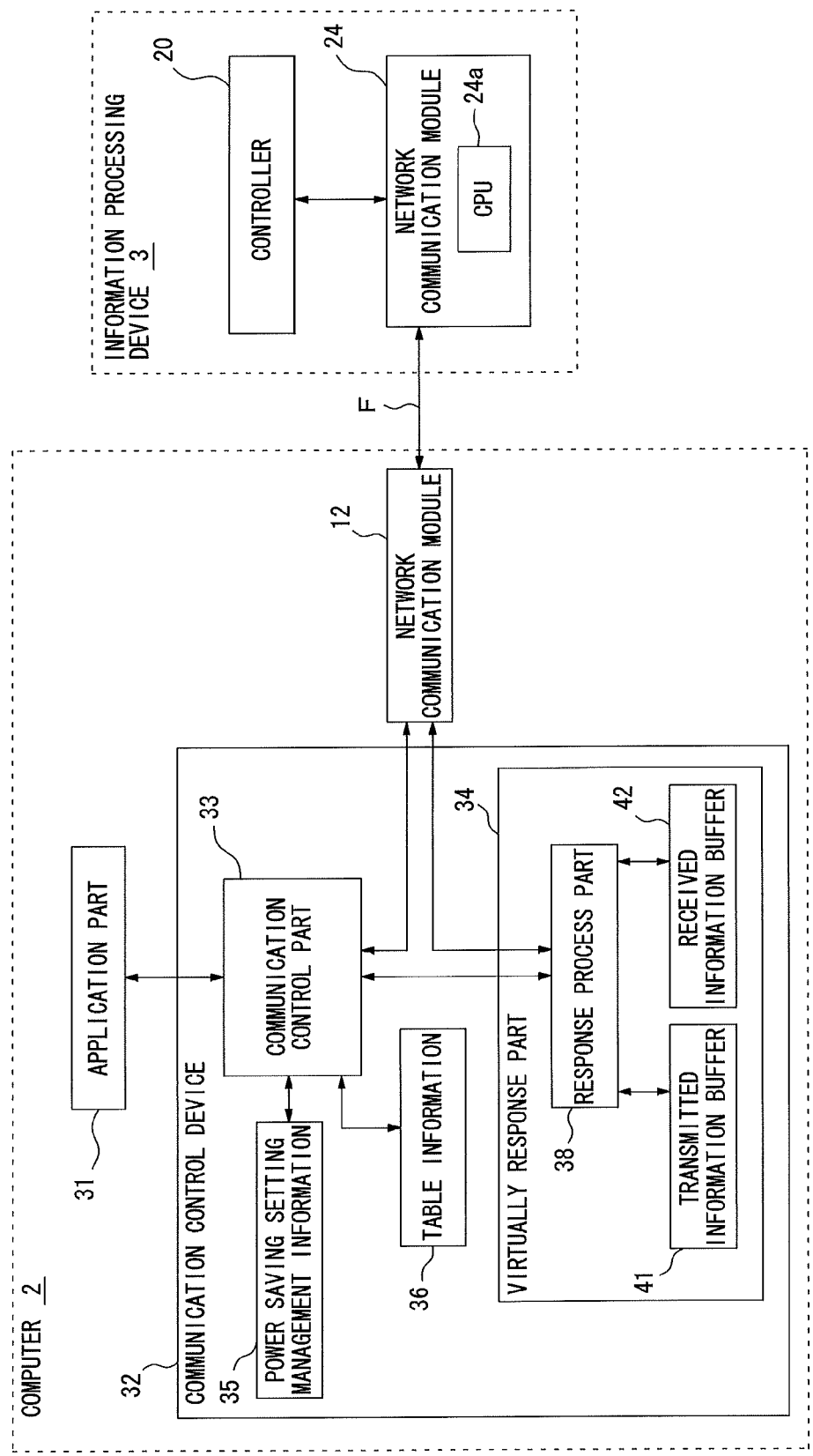
FIG. 5 is a block diagram showing the functional configuration realized by a CPU of the computer.

A functional configuration realized by execution of the communication control program 18 and the application program 17 in the computer 2 of the present preferred embodiment is explained below. FIG. 5 is a block diagram showing the functional configuration realized by the CPU 10 of the computer 2. Referring to FIG. 5, the computer 2, by execution of the communication control program 18, functions as a communication control device 32. The computer 2 further functions as an application part 31 by execution of the application program 17.

The application part 31 manages the information processing device 3. To be more specific, the application part 31, for example, includes the functions of managing the status of the information processing device 3, transmitting a job to the information processing device 3, canceling the job transmitted to the information processing device 3 and changing settings of the information processing device 3 as described above. The application part 31 generates a variety of commands transmitted to the information processing device 3 on a regular or irregular basis to manage or control the information processing device 3.

After generating the command to transmit to the information processing device 3, the application part 31 outputs the generated command to the communication control device 32. The application part 31 transmits and receives data via the communication control device 32 rather than transmitting and receiving data with the information processing device 3 directly by itself. After outputting the command to the communication control device 32, the application part 31 waits for the receipt of response information replying the command for a predetermined period of time. As receiving the response information responding to the output command, the application part 31, based on the received response information, updates management information of the information processing device 3 or distinguishes a result of a particular process requested to the information processing device 3.

The communication control device 32 controls the overall data communication with the information processing device 3 via the network communication module 12. The communication control device 32 resident in the computer 2 relays data transmitted and received with each other between the application part 31 and the information processing device 3 as stated above.

Referring to FIG. 5, the communication control device 32 mainly including a communication control part 33 and a virtually response part 34 manages power saving setting management information 35 and table information 36 stored in the device such as the memory 11 and the storage device 15.

The communication control part 33 receives the variety of commands from the application part 31, and determines how to perform data communication by analyzing each of the commands. The communication control part 33 executes a process corresponding to the determination, thereby sending the response information responding to the command received from the application part 31 to the application part 31. The communication control part 33 refers to, as determining how to perform data communication based on the command received from the application part 31, the power saving setting management information 35 and the table information 36 managed thereby.

The power saving setting management information 35 is generated based on the power saving setting information 29 received from the information processing device 3 connected through the network 4. For more than one information processing devices 3 connected through the network 4, the power saving setting of each information processing device 3 is listed in the information. FIG. 6 shows an example of the power saving setting management information 35. As shown in FIG. 6, the power saving setting management information 35 is table information in which a device name, a network address and a power saving setting of each information processing device 3 are associated with each other. The information processing devices 3 having their device names "MFP 1" and "MFP 2" are both set to enter the sleep mode ST2 and the advanced sleep mode ST3. The information processing device 3 having its device name "MFP 3" is set to enter neither of the sleep mode ST2 nor the advanced sleep mode ST3. The information processing device 3 having its device name "MFP 4" is set to enter only the sleep mode ST2 and not the advanced sleep mode ST3.

The communication control part 33 obtains in advance the power saving setting information 29 from each of the information processing devices 3 and registers in the power saving setting management information 35. So, the communication control part 33 is capable of determining, without data communication, whether or not each information processing device 3 enters the power saving mode. It is allowed to set any timing of obtaining the power saving setting information 29 in the information processing device 3 by the communication control part 33. The power saving setting information 29 may, for example, be obtained in advance through data communication with the information processing device 3 at start-up of the communication control device 32.

The variety of commands received from the application part 31 are listed in the table information 36. FIG. 7 shows an example of the table information 36. As illustrated in FIG. 7, multiple commands received from the application part 31 are registered and included in the table information 36. Every registered command requests data communication with the information processing device 3 to the communication control part 33, hence, requests execution of corresponding processes to the information processing device 3.

The table information 36 includes information showing a protocol in data communication and necessity of immediate transmission. The information is registered for each command. For the command not requiring immediate transmission, information as to an alternative task and information as to an actual communication restriction condition are further registered. The information showing the necessity of immediate transmission is information in which whether or not the command received from the application part 31 is necessary to be transmitted to the information processing device 3 immediately is defined in advance. The commands, fallen into two types; requiring immediate transmission and not requiring immediate transmission, are registered in the table information 36. More in detail, a first command list 36*a* includes the command, not requiring immediate transmission, registered as the command requesting virtual data communication with the virtually response part 34. On the other hand, a second command list 36*b* includes the command, requiring immediate transmission, registered as the command requesting prompt data communication with the information processing device 3.

The table information 36 of FIG. 7 includes a continuity check command, a device information obtaining command, a support command obtaining command and a search command registered as the command requesting the virtual data communication with the virtually response part 34 in the first command list 36*a*.

The continuity check command is output from the application part 31 on a regular basis to detect whether or not any network failure is occurred. In response to receipt of the continuity check command, for example, the information processing device 3 goes into the normal mode ST1 to generate the response information showing that it is capable of executing a job and send the response. As receiving the response information responding to the output continuity check command, the application part 31 may gain information showing that no network failure is occurred.

The device information obtaining command is output from the application part 31 on a regular basis to obtain device information of the information processing device 3. In order to gain information to see if any error such as paper out, toner shortage or a paper jam is occurred in the information processing device 3, or to gain information to manage the number of printed outputs in the information processing device 3, the application part 31 obtains the device information on the regular basis from the information processing device 3. The application part 31 obtained the device information updates the management information. Thus, the application part 31 outputs the device information obtaining command on the regular basis. In response to receipt of the device information obtaining command, for example, the information processing device 3 goes into the normal mode ST1 to generate the device information, as the response information, showing occurrence or nonoccurrence of the error, or the number of the printed outputs in the current state of the device, and send the response. The application part 31 receives the response information responding to the device information obtaining command, thereby gaining information as to the device state of the information processing device 3 and managing.

The support command obtaining command is output from the application part 31 to obtain at least one command type supported by the information processing device 3. The command is output at the start-up of the application part 31. The application part 31 may not obtain the corresponding response information from the information processing device 3 unless it outputs the command analyzable by the information processing device 3 to the information processing device 3. The continuity check command and the device information obtaining command explained above are different commands as they are fallen into the different command types. The application part 31 outputs the support command obtaining command at its start-up, for instance. In response to receipt of the support command obtaining command, the information processing device 3 goes into the normal mode ST1 to generate the response information including the command type and send the response. The application part 31 receives the response information responding to the output support command obtaining command. So, the application part 31 is allowed to specify, with the received response information, the command type supported by the information processing device 3 and generate the command matching the specified command type for output.

The search command is output from the application part 31 on a regular basis to search for the information processing device 3 currently in operation in the network environment. In response to receipt of the search command, for example, the information processing device 3 goes into the normal mode ST1 to generate the response information showing that it is capable of executing a job and send the response. The application part 31 receives the response information responding to the output search command, thereby gaining information showing which information processing device 3 connected through the network 4 is currently in operation.

The command registered in the first command list 36a of the table information 36 requesting virtual data communication with the virtually response part 34 is the command which is output from the application part 31 on the regular or irregular basis, so that the application part 31 is capable of managing the information processing device 3. This kind of command requests only to transmit the response information responding to the command to the information processing device 3. Thus, the command does not request any specific operation to be executed immediately in the information processing device 3. This is why the above-described commands are registered as the command not requiring immediate transmission.

A job execution command, a job deletion command and a setting change command are registered in the second command list 36b which includes the command requesting prompt data communication with the information processing device 3 in FIG. 7.

The job execution command is output from the application part 31 to give an instruction on execution of a job to the information processing device 3. In response to receipt of the job execution command, for example, the information processing device 3 goes into the normal mode ST1 to start execution of the job. Substantial data of the job including print data may be attached to the job execution command. Also, information to specify the job may be attached if the job already stored in the information processing device 3 is to be executed. As completing execution of the job specified with the job execution command, the information processing device 3 generates the response information showing completion of the execution of the job and sends the response. The application part 31 receives the response information, thereby gaining information showing that the execution of the job is completed normally in the information processing device 3.

The job deletion command is output from the application part 31 to give an instruction on deletion of a job stored in the information processing device 3. In response to receipt of the job deletion command, for example, the information processing device 3 goes into the normal mode ST1 to delete the job specified with the job deletion command. As completing deletion of the job specified with the job deletion command, the information processing device 3 generates the response information showing completion of the deletion of the job and sends the response. The application part 31 receives the response information, thereby gaining information showing that the deletion of the job is completed normally in the information processing device 3.

The setting change command is output from the application part 31 to give an instruction to change settings of the information processing device 3. The settings to be changed include setting of user registration information in which a user unrestricted to use the information processing device 3 is registered in advance, for example. The instruction is given to change the user registration information by additionally registering a new user, or by updating or deleting the registered user information, for example. The output of the setting change command also allows giving an instruction to change the detail of the power saving setting information 29 in the information processing device 3. In response to receipt of the setting change command, for example, the information processing device 3 goes into the normal mode ST1 to reflect the substance of the change in the setting specified with the setting change command. As completing the setting change process specified with the setting change command, the information processing device 3 generates the response information showing completion of the change in the setting and sends the response. The application part 31 receives the response information, thereby gaining information showing that the change in the setting is reflected normally in the information processing device 3.

The command registered in the second command list 36b of the table information 36 requests prompt data communication with the information processing device 3. This kind of command is output from the application part 31 on the irregular basis. The command requests to transmit the response information responding to the command to the information processing device 3, but also requests to immediately execute a specific operation in the information processing device 3. It is important for such command to cause the information processing device 3 to execute the specific operation therein at time of the output of the command. So, it is less important for the command to obtain the response information as the response. That is why the command is registered as the command requesting prompt data communication.

As receiving the command from the application part 31, the communication control part 33 refers to the power saving setting management information 35 and determines whether or not the information processing device 3, to which the command is addressed, enters the sleep mode ST2 or the advanced sleep mode ST3. If the information processing device 3, to which the command is addressed, is set to enter the sleep mode ST2 or the advanced sleep mode ST3, the communication control part 33 further refers to the table information 36. The communication control part 33 then determines whether or not the received command is registered in the first command list 36a which includes the command requesting the virtual data communication with the virtually response part 34. When the command received from the application part 31 is registered in the first command list 36a, the communication control part 33 designates the virtually response part 34 as the destination of the command. At the same time, the communication control part 33 refers to the information as to the alternative task and the information as to the actual communication restriction condition registered in the table information 36, thereby designating the alternative task to be executed by the virtually response part 34. The communication control part 33 puts the virtually response part 34 into operation to function, and outputs the command received from the application part 31 to the virtually response part 34. The communication control part 33 then gives an instruction on execution of the alternative task.

In the cases other than the above-described case, that is to say, when the information processing device 3, to which the command is addressed, is set not to enter the sleep mode ST2 or the advanced sleep mode ST3, or when the command registered in the second command list 36b is received from the application part 31, the communication control part 33 immediately outputs the command received from the application part 31 to the network communication module 12, thereby transmitting the command to the information processing device 3.

The alternative task is a process executed hypothetically by the virtually response part 34 to replace the operation made by the information processing device 3. To be more specific, execution of the alternative task allows the communication control part 33 to output the command to the virtually response part 34 and obtain the response information responding to the command. The alternative task is executed to replace the process of transmitting the command to the information processing device 3 directly via the network communication module 12 by the communication control part 33. Since the execution of the alternative task realizes the different processes among commands, the alternative task is set for each command registered in the first command list 36a of the table information 36. The continuity check command has an alternative task A set and the device information obtaining command has an alternative task B set, for example. The support command obtaining command has an alternative task C set and the search command has an alternative task D set. Those alternative tasks A, B, C and D are set to realize processes basically not involving unnecessary data communication with the information processing device 3.

The virtually response part 34 of FIG. 5 includes a response process part 38, a transmitted information buffer 41 and a received information buffer 42. The response process part 38 generates, by executing the alternative task designated by the communication control part 33, the response information responding to the command received from the communication control part 33 and outputs the generated response information to the communication control part 33. The transmitted information buffer 41 stores therein the command received from the communication control part 33. The received information buffer 42 stores therein the response information actually received from the information processing device 3.

The response process part 38 does not cause actual data communication with the information processing device 3 if the response information responding to the command has already been stored in the received information buffer 42. The response process part 38 reads the response information in the received information buffer 42 and outputs to the communication control part 33 as the virtual response information. The response process part 38 is not allowed to generate the response information if there is no response information responding to the command in the received information buffer 42.

In the present preferred embodiment, the number of times each alternative task A, B, C and D set for the respective commands has been executed by the response process part 38 is managed by the communication control part 33. The communication control part 33 changes, based on the number of the execution times, the process to be realized by the execution of each alternative task A, B, C and D. That is to say, the communication control part 33 causes the response process part 38 to execute each alternative task A, B, C and D. In this case, with the first execution of the alternative task, the actual response information responding to the command is obtained, through the actual data communication with the information processing device 3, from the information processing device 3 and storing the obtained response information in the received information buffer 42. The process to output the response information actually obtained from the information processing device 3 by the virtually response part 34 is designated as the alternative task corresponding to the first execution. For the second and subsequent execution, the response information responding to the command has been stored in the received information buffer 42. The communication control part 33 designates, as the alternative task corresponding to the second and subsequent execution, the process to read the response information previously obtained from the information processing device 3 and output. The designated alternative task is executed to replace the process of performing the actual data communication with the information processing device 3.

In execution of the alternative task designated by the communication control part 33, the response process part 38 outputs the command received from the communication control part 33 to the network communication module 12 and actually transmits to the information processing device 3 in response to the first execution of the designated alternative task. The response process part 38 receives the response information responding to the command from the information processing device 3, and stores the received response information in the received information buffer 42. The response process part 38 then outputs the received response information to the communication control part 33. When the alternative task designated by the communication control part 33 is executed for the second and subsequent times, the actual data communication with the information processing device 3 is not performed. The response process part 38 reads the response information in the received information buffer 42 previously obtained, and outputs the read response information as the virtual response information to the communication control part 33. At the same time, the response process part 38 stores the command received from the communication control part 33 in the transmitted information buffer 41.

As described above, the communication control part 33 receives the command registered in the first command list 36a. The communication control part 33 then outputs the received command with the instruction on execution of the alternative task set for the command to the virtually response part 34, thereby obtaining the response information responding to the command from the virtually response part 34. The communication control part 33 outputs the response information obtained from the virtually response part 34 to the application part 31. In response to the receipt, the application part 31 is allowed to obtain the response information responding to the command output to the communication control part 33. As a result, the application part 31 is allowed to normally continue managing the information processing device 3 based on the obtained response information and to avoid itself to be stopped functioning.

As receiving the same command repeatedly from the application part 31, the communication control part 33 designates the alternative task corresponding to the second and subsequent execution and causes the virtually response part 34 to execute the designated alternative task corresponding to the second and subsequent. Therefore, the actual data communication is not performed between the computer 2 and the information processing device 3. It is assumed that the information processing device 3 has gone into the sleep mode ST2 or the advanced sleep mode ST3 at receipt of the same command from the application part 31 by the communication control part 33. Even in such a case, the information processing device 3 is not required to revert back to the normal mode ST1 since no command is transmitted thereto. This may ensure to keep the sleep mode ST2 or the advanced sleep mode ST3 uninterrupted, and further, to continue the power saving mode on the information processing device 3.

It is assumed that the command, not requiring immediate transmission, of at least one command received from the application part 31 by the communication control part 33 is output more than once. Any data communication may not be performed between the computer 2 and the information processing device 3 in response to the receipt of the command for the second and subsequent times. In such a case, the application part 31 is not allowed to obtain any information as to the information processing device 3. This may lead to the inferior user friendliness of the application program 17. By way of example, every device information obtaining command output by the application part 31 on the regular basis may not be transmitted to the information processing device 3. The device information obtaining command is output by the application part 31 to gain information as to the information processing device 3 to see whether or not any error including paper out, toner shortage or the paper jam is occurred, or to see the number of printed outputs. If the command is not transmitted in response to every output, the application part 31 is not allowed to manage the information as to the information processing device 3. It results in the inferior user friendliness of the function provided by the application part 31.

In order to prevent the inferior user friendliness, information as to the actual communication restriction condition is registered for each command registered in the first command list 36a in the table information 36 of the present preferred embodiment. The actual communication restriction condition for restriction on actual data communication between the computer 2 and the information processing device 3 is set in advance based on the number of the output or time interval of the output of the command from the application part 31. The communication control part 33 determines whether or not the actual communication restriction condition is met when giving the instruction on execution of the alternative task to the virtually response part 34. As the actual communication restriction condition is met, the instruction on execution of the alternative task corresponding to the first execution is given even though the alternative task is executed for the second or subsequent times. Such instruction is given to update the information in the received information buffer 42.

By referring to the fields of the actual communication restriction condition corresponding to the continuity check command and the support command obtaining command in FIG. 7, no condition is set for either of the restriction of frequency or the restriction of time. Therefore, in response to the output, except for the first output, of those commands from the application part 31, the actual data communication with the information processing device 3 is restricted with no restriction.

For the field of the actual communication restriction condition corresponding to the device information obtaining command, 30 times is set as the restriction of frequency. When the device information obtaining command is output from the application part 31 for the second to the thirtieth time, the actual data communication with the information processing device 3 is restricted. For the thirty-first output, the same process as the one for the first output is executed. So, when giving the instruction on the execution of the alternative task to the virtually response part 34, the communication control part 33 designates the alternative task corresponding to the first execution. As a result, the information stored in the received information buffer 42 as the response information responding to the device information obtaining command may be updated in predetermined intervals. The problem that the application part 31 is not allowed to gain any information as to the state of the information processing device 3 can be solved.

In the present preferred embodiment, as being caused to execute the alternative task for the first time by the communication control part 33, the virtually response part 34 is also caused to send a request for notification of change in the information processing device 3. With the first time execution of the alternative task in response to the instruction of the communication control part 33, the response process part 38 sends the request for notifying the change when any change is occurred in the state of the information processing device 3 ahead.

In response to the receipt of the request for notification, the information processing device 3 manages the request for notification. When the error including paper out, toner shortage or the paper jam is occurred, when the number of printed outputs reached the predetermined number, or when the information processing device 3 is being turned off, upon the receipt of the request for notification, the information processing device 3 transmits, to the computer 2, information to notify the change in the state based on the request for notification received in advance.

The response process part 38 receives the information to notify the change in the state from the information processing device 3 in response to the request for notification transmitted to the information processing device 3. The response process part 38 then stores the received information in the received information buffer 42. The response process part 38 reads the information at execution of the alternative task in response to the instruction of the communication control part 33 and outputs to the communication control part 33 as the virtual response information. The number of the execution of the alternative task set for the device information obtaining command sometimes has not reached 30 times. Even in such a case, the response information is generated based on the information notified by the information processing device 3. So, the application part 31 is allowed to gain information as to the change in the state of the information processing device 3 relatively early.

The response process part 38 receives the information to notify the change in the state from the information processing device 3 in response to the request for notification transmitted to the information processing device 3. At the receipt of the information, the response process part 38 reads the command in the transmitted information buffer 41 and transmits to the information processing device 3. The response process part 38 is allowed to obtain the most recent response information responding to the command from the information processing device 3 and to store in the received information buffer 42. The information processing device 3, however, sometimes transmits the information to notify that it is being turned off. In this case, the response information may not be obtained even the command is transmitted to the information processing device 3. The command may be set not to be transmitted in response to the receipt of the information to notify that the information processing device 3 is being turned off.

As receiving the information from the information processing device 3, the response process part 38 transmits the command in the transmitted information buffer 41 to the information processing device 3. The information processing device 3 is considered to be in the normal mode ST1 and not in the sleep mode ST2 or the advanced sleep mode ST3 since it is allowed to transmit some kind of information. The command in the transmitted information buffer 41 is transmitted at the receipt of the information, so the updated response information may be obtained from the information processing device 3 without interrupting the power saving mode on the information processing device 3.

The response process part 38 executes the alternative task, corresponding to the second and subsequent execution, set for the command, thereby reading the updated response information obtained as described above. The response process part 38 reads the updated response information in the received information buffer 42 and outputs to the application part 31 via the communication control part 33.

As described above, the communication control part 33 of the present preferred embodiment determines whether or not to perform the virtual data communication with the virtually response part 34 based on the command received from the application part 31. When determining to perform the virtual data communication, the communication control part 33 hypothetically performs the virtual data communication with the virtually response part 34. The communication control part 33 then obtains the virtual response information responding to the command received from the application part 31 and outputs the obtained virtual response information to the application part 31. This allows the application part 31 to be functioning effectively, and the continuous of the power saving mode on the information processing device 3.

The communication control part 33 makes the determination based on the command received from the application part 31 to determine how to perform the data communication. Therefore, it is not necessary to determine accurately whether the information processing device 3 is in the sleep mode ST2 or in the advanced sleep mode ST3 at time of the determination. The burden on the communication control device 32 resident in the computer 2 may be reduced. In contrast, it should be avoided to manage the operational status of the information processing device 3 by the communication control part 33 in real time as it may cause the burden on the communication control device 32 resident in the computer 2 to be increased. This is because information such as the management table should be updated in response to every change in the operational status of the information processing device 3.

The data communication between the computer 2 and the information processing device 3 is explained next. FIG. 8 shows an example of the data communication performed when the command not requiring immediate transmission is received from the application part 31. After receiving the command not requiring immediate transmission from the application part 31, the communication control part 33 designates the alternative task set for the received command (process P1). The communication control part 33 specifies to perform actual data communication with the information processing device 3 as the alternative task designated thereby is to be executed for the first time. The communication control part 33 outputs the instruction on execution of the designated alternative task to the virtually response part 34. The virtually response part 34 determines the alternative task designated by the communication control part 33, and specifies to perform actual data communication with the information processing device 3 if the alternative task is executed for the first time (process P2). The request for notification to request for notifying the change when any change is occurred in the state of the information processing device 3 is sent to the information processing device 3 by the virtually response part 34. At almost the same time as the request for notification, the virtually response part 34 sends the command received from the communication control part 33 to the information processing device 3, and sends the request for response to the command.

As well as receiving the request for notification from the virtually response part 34, the information processing device 3 receives the command from the virtually response part 34. The information processing device 3 then generates response information responding the command received from the virtually response part 34 and transmits the generated response information to the virtually response part 34.

As receiving the response information from the information processing device 3, the virtually response part 34 outputs the received response information to the communication control part 33. The communication control part 33 outputs the response information to the application part 31, thereby sending a response to the command received from the application part 31. Also, the virtually response part 34 stores the response information from the information processing device 3 in the received information buffer 42 (process P3).

In response to the receipt of the command not requiring immediate transmission, the same as the one previously received, from the application part 31 thereafter, the communication control part 33 designates the alternative task corresponding to the command (process P4). The designated alternative task has already been executed once. For the second and subsequent execution of the designated alternative task, the communication control part 33 specifies to send a response by transmitting the virtual response information based on the response information the communication control part 33 has previously obtained from the information processing device 3. For this time, the communication control part 33 does not perform the actual data communication with the information processing device 3. The communication control part 33 then outputs the instruction on execution of the designated alternative task to the virtually response part 34. The virtually response part 34 determines the alternative task designated by the communication control part 33. If it is the second or subsequent execution, the virtually response part 34 reads the previous response information in the received information buffer 42 and generates the virtual response information for this time based on the previous response information (process P5). The virtually response part 34 outputs the generated virtual response information to the communication control part 33. The communication control part 33 outputs the virtual response information from the virtually response part 34 to the application part 31, thereby sending a response to the command received from the application part 31. The virtually response part 34 stores the command received from the communication control part 33 in the transmitted information buffer 41 (process P6).

The execution of the process P4, P5 and P6 in the computer 2 does not require data communication with the information processing device 3. Therefore, even when the information processing device 3 is in the sleep mode ST2 or the advanced sleep mode ST3, the power saving mode is not interrupted. The application part 31 is capable of obtaining the response information responding to the command the application part 31 output, hence, is allowed to keep managing the information processing device 3 normally without being stopped functioning.

Figure 9:
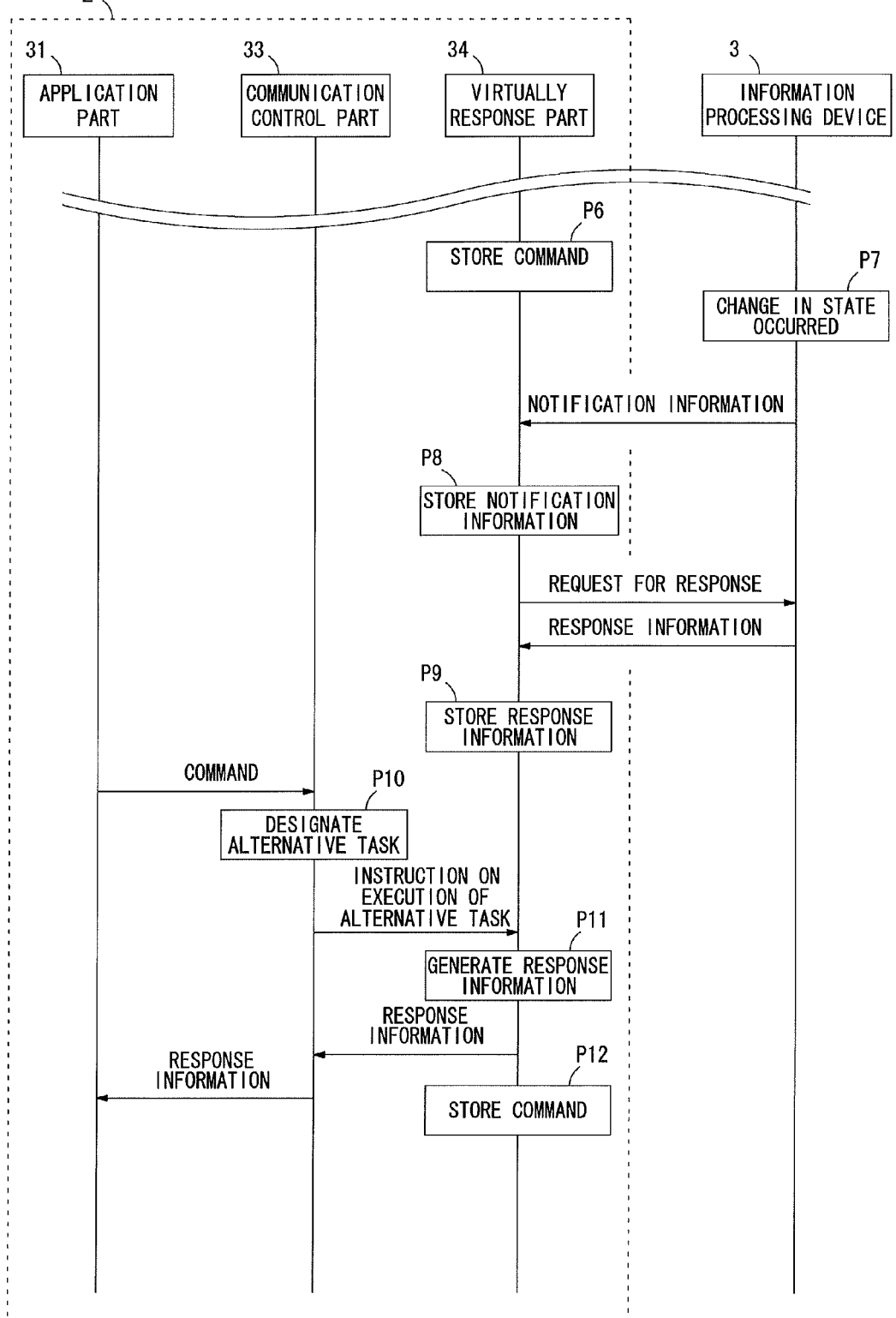
FIG. 9 shows an example of the data communication performed when notification information is received from the information processing device by a virtually response part in response to a request for notification transmitted in advance to the information processing device.

FIG. 9 shows an example of the data communication performed when the notification information is received from the information processing device 3 by the virtually response part 34 in response to the request for notification transmitted in advance to the information processing device 3. As executing the alternative task corresponding to the second or subsequent execution by the virtually response part 34, the command received from the communication control part 33 is stored in the transmitted information buffer 41 (process P6). It is assumed that some kind of the change is occurred in the state of the information processing device 3 (process P7). The change includes occurrence of the error or that the number of the printed outputs is reached the predetermined number. In this case, the information processing device 3 transmits the notification information notifying the detail of the change to the virtually response part 34 in response to the request for notification received in advance.

After receiving the notification information from the information processing device 3, the virtually response part 34 stores the received notification information in the received information buffer 42 (process P8). The virtually response part 34 should update the previous response information in the received information buffer 42 based on the notification information.

The virtually response part 34 does not output the notification information to the communication control part 33 soon after receiving the information from the information processing device 3. The application part 31 outputs the command to manage the information processing device 3. The application part 31 is then put into a waiting state where waiting for the response information responding to the command until the predetermined period of time elapses from the output. The application part 31 may receive the response information during the predetermined period of time but not after or before the predetermined period of time. The notification information in the received information buffer 42 is output to the communication control part 33 from the virtually response part 34 in response to the receipt of the command from the application part 31.

The virtually response part 34 received the notification information from the information processing device 3 reads the command yet to be transmitted in the transmitted information buffer 41 and transmits the command to the information processing device 3. Thus, the response to the command is requested. The information processing device 3 which transmitted the notification information is considered to be in neither of the sleep mode ST2 nor the advanced sleep mode ST3. The virtually response part 34 then transmits, at the receipt of the notification information, the command yet to be transmitted. The information processing device 3 is not necessary to exit the sleep mode ST2 or the advanced sleep mode ST3 to receive the command from the virtually response part 34 and transmit the response information responding to the command to the virtually response part 34.

As receiving the response information from the information processing device 3, the virtually response part 34 stores the received response information in the received information buffer 42 (process P9). The virtually response part 34 does not output the response information received from the information processing device 3 to the communication control part 33 in this process either.

With receipt of the command, not requiring immediate transmission from the application part 31, the same one as the previous receipt, the communication control part 33 designates the alternative task set for the received command (process P10). For the second and subsequent execution of the designated alternative task, the communication control part 33 does not perform the actual data with the information processing device 3. The communication control part 33 specifies to send a response by transmitting the virtual response information based on the response information previously obtained from the information processing device 3. The communication control part 33 then gives the instruction on execution of the designated alternative task to the virtually response part 34. The virtually response part 34 determines the alternative task designated by the communication control part 33. The execution for this time is determined to be the second or subsequent execution. So, the virtually response part 34 reads the response information in the received information buffer 42 and generates the virtual response information to be sent as the response to the command (process P11). The information stored in the received information buffer 42 in the above-described process P8 or P9 is contained in the virtual response information generated by the virtually response part 34 in the process P11. The virtually response part 34 outputs the generated virtual response information to the communication control part 33. The communication control part 33 outputs the virtual response information received from the virtually response part 34 to the application part 31, thereby sending the response to the command received from the application part 31. In addition, the virtually response part 34 stores the command received from the communication control part 33 in the transmitted information buffer 41 (process P12).

Figure 10:
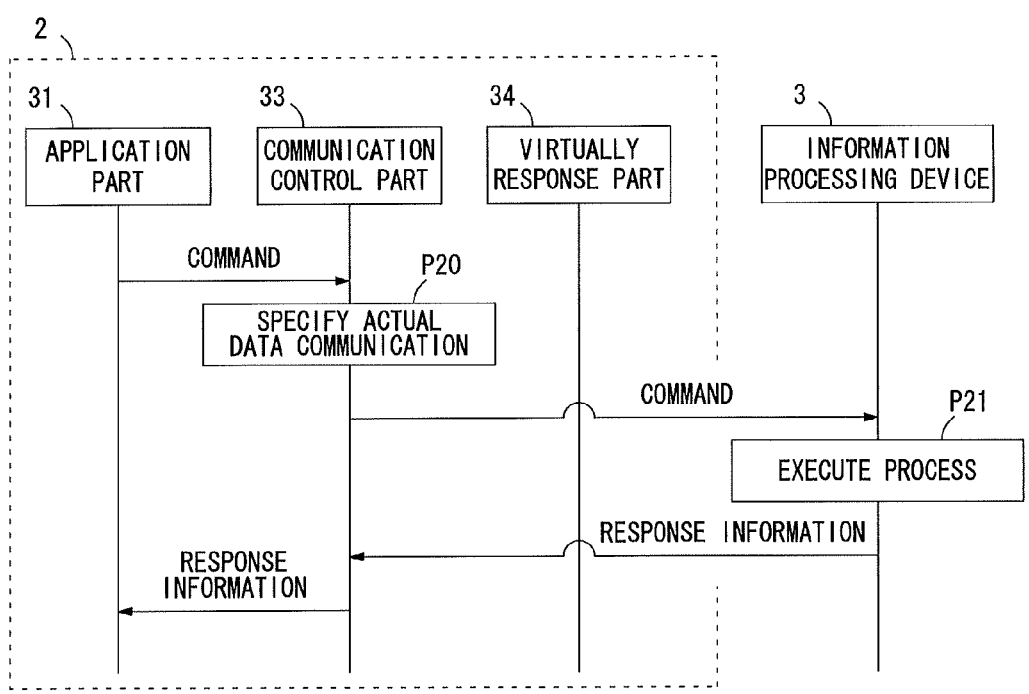
FIG. 10 shows an example of the data communication performed when the command requiring immediate transmission is received from the application part.

FIG. 10 shows an example of the data communication performed when the command requiring immediate transmission is received from the application part 31. After receiving the command requiring immediate transmission from the application part 31, the communication control part 33 specifies to allow the actual data communication with the information processing device 3 soon after analyzing the received command (process P20). The communication control part 33 transmits the command received from the application part 31 to the information processing device 3. The information processing device 3 received the command from the communication control part 33 executes the process corresponding to the command (process P21). The information processing device 3 is sometimes in the sleep mode ST2 or the advanced sleep mode ST3 at the receipt. If so, the information processing device 3 exits the mode and reverts back to the normal mode ST1 to execute the process corresponding to the command in preference. So, the information processing device 3 immediately executes a predetermined process specified by the application part 31. After executing the process corresponding to the command, the information processing device 3 generates the response information showing completion of execution and transmits to the communication control part 33. The communication control part 33 received the response information outputs to the application part 31, thereby allowing the application part 31 to gain the information showing that the process corresponding to the command requiring immediate transmission is immediately executed by the information processing device 3.

The communication control device 32 of the present preferred embodiment causes the communication control part 33 to change how to perform the data communication depending on whether the command received from the application part 31 is registered in the first command list 36a or in the second command list 36b. To be more specific, when the command, not requiring immediate transmission, registered in the first command list 36a is received from the application part 31, the virtual data communication between the communication control part 33 and the virtually response part 34 is hypothetically performed. So, the data communication with the information processing device 3 is not actually performed. Through the virtual data communication, the virtual response information is generated by the virtually response part 34 and outputs the virtual response information is output to the application part 31. When the command, requiring immediate transmission, registered in the second command list 36b is received from the application part 31, the actual data communication between the communication control part 33 and the information processing device 3 is performed. Through the actual data communication, the response information is received from the information processing device 3 and output to the application part 31. Operation sequences executed by the communication control device 32, the communication control part 33 and the virtually response part 34 are explained in detail below.

Figure 11:
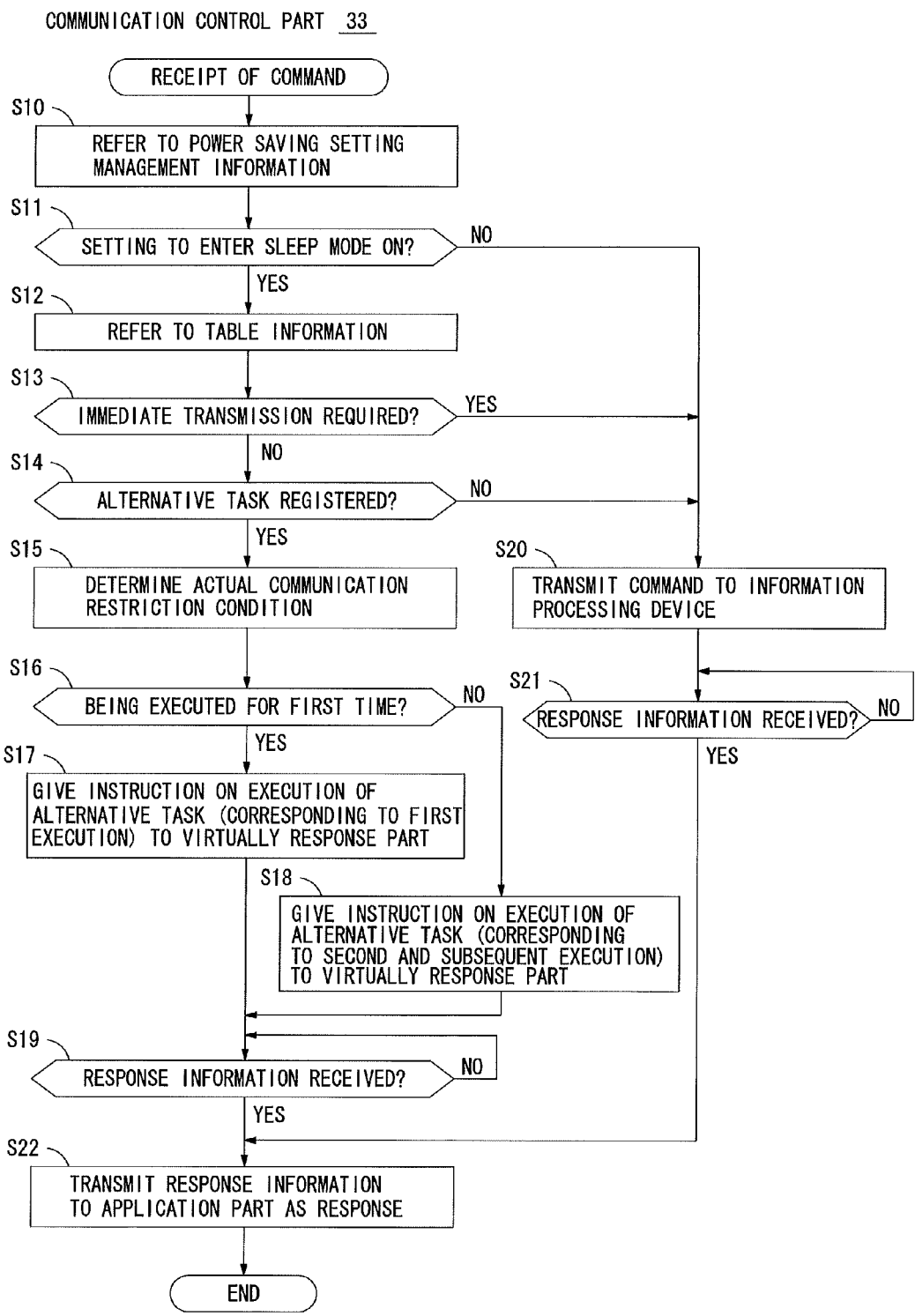
FIG. 11 is a flow diagram explaining an exemplary process sequence of the process executed when a communication control part receives the command from the application part.

FIG. 11 is a flow diagram explaining an exemplary process sequence of the process executed when the communication control part 33 receives the command from the application part 31. By referring to FIG. 11, in response to the receipt of the command from the application part 31, the communication control part 33 identifies the information processing device 3 to which the command is addressed, and refers to the power saving setting management information 35 (step S10). The communication control part 33 determines whether or not the power saving setting of the information processing device 3 to which the command is addressed is set to allow the operational status to enter the sleep mode ST2 or the advanced sleep mode ST3 (hereafter, on setting) (step S11). If the power saving setting is on (when a result of step S11 is YES), the communication control part 33 refers to the table information 36 next (step S12) to determine whether or not the command received from the application part 31 is registered in the first command list 36a including the commands not requiring the immediate transmission (step S13). When the command registered in the first command list 36a is received (when a result of step S13 is NO), the communication control part 33 determines whether or not any alternative task is registered for the command (step S14).

As the alternative task set for the command received from the application part 31 is registered (when a result of step S14 is YES), the communication control part 33 determines to allow the virtual data communication with the virtually response part 34. The virtual data communication is performed to replace the actual data communication with the information processing device 3. The communication control part 33 refers to the information as to the actual communication restriction condition registered in the table information 36 (step S15) to determine which alternative task, one corresponding to the first execution or one corresponding to the second and subsequent execution, should be executed by the virtually response part 34 (step S16). As the alternative task corresponding to the first execution is determined to be executed (when a result of step S16 is YES), the communication control part 33 outputs the instruction on execution of the alternative task corresponding to the first execution to the virtually response part 34 (step S17), while outputting the command received from the application part 31 to the virtually response part 34. As the alternative task corresponding to the second and subsequent execution is determined to be executed (when a result of step S16 is NO), the communication control part 33 outputs the instruction on execution of the alternative task corresponding to the second and subsequent execution to the virtually response part 34 (step S18), while outputting the command received from the application part 31 to the virtually response part 34. The communication control part 33 is put into the waiting state where waiting for the response information from the virtually response part 34 (step S19). In response to the receipt of the response information from the virtually response part 34 (when a result of step S19 is YES), the communication control part 33 transmits the received response information as the response to the application part 31 (step S22).

When the power saving setting of the information processing device 3 to which the command is addressed, is determined to be off in response to the determination in step S11 (when a result of step S11 is NO), when the command received from the application part 31 is determined to be registered in the second command list 36b including the commands requiring the immediate transmission in response to the determination in step S13 (when a result of step S13 is YES), or when the alternative task set for the command is determined not to be registered in the table information 36 in response to the determination in step S14 (when a result of step S14 is NO), the communication control part 33 determines to allow actual data communication with the information processing device 3. The communication control part 33 transmits the command received from the application part 31 to the information processing device 3 (step S20). The communication control part 33 is then put into the waiting state where waiting for the response information from the information processing device 3 (step S21). With receipt of the response information from the information processing device 3 (when a result of step S21 is YES), the received response information is transmitted to the application part 31 as the response (step S22). Thus, the process executed by the communication control part 33 is completed.

Figure 12:
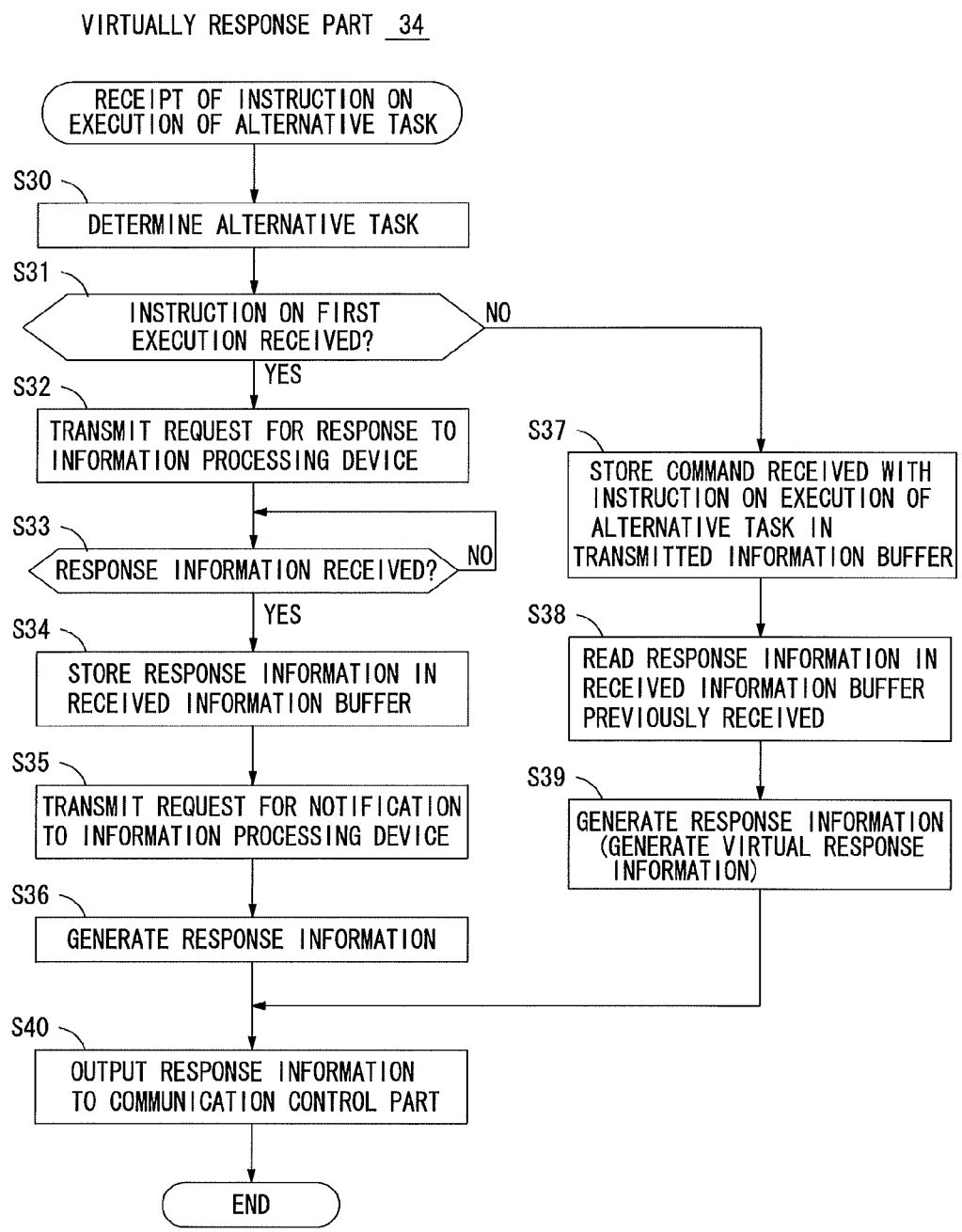
FIG. 12 is a flow diagram explaining an exemplary process sequence of the process executed when the virtually response part receives an instruction on execution of an alternative task from the communication control part.

FIG. 12 is a flow diagram explaining an exemplary process sequence of the process executed when the virtually response part 34 receives the instruction on execution of the alternative task from the communication control part 33. As shown in FIG. 12, after receiving the instruction on execution of the alternative task, the virtually response part 34 determines the alternative task to execute (step S30) to designate the alternative task set for the command. The virtually response part 34 also determines whether or not the instruction on the first execution is received (step S31).

When the instruction on the first execution is determined to be received (when a result of step S31 is YES), the virtually response part 34 transmits the command from the communication control part 33 to the information processing device 3, thereby sending the request for the response information to the information processing device 3 (step S32). The virtually response part 34 is put into the waiting state where waiting for the response information received from the information processing device 3 (step S33). As receiving the response information from the information processing device 3 (when a result of step S33 is YES), the virtually response part 34 stores the received response information in the received information buffer 42 (step S34). The virtually response part 34 also sends the request for notification to request that the information processing device 3 notifies the change when any change is occurred in its state (step S35). The virtually response part 34 generates the response information to output to the communication control part 33 based on the response information received from the information processing device 3 (step S36).

When the instruction on the second or subsequent execution is received as the result of the determination in step S31 (when a result of step S31 is NO), the virtually response part 34 stores the command received with the instruction on execution of the alternative task in the transmitted information buffer 41 (step S37). The virtually response part 34 reads the response information responding to the command from response information previously received and stored in the received information buffer 42 (step S38). The virtually response part 34 then generates the response information to output to the communication control part 33 based on the read response information (step S39). The response information thereby generated is different from one actually obtained from the information processing device 3, hence, is used as the virtual response information.

The virtually response part 34 outputs the response information generated in step S36 or step S39 to the communication control part 33 and completes the process (step S40).

Figure 13:
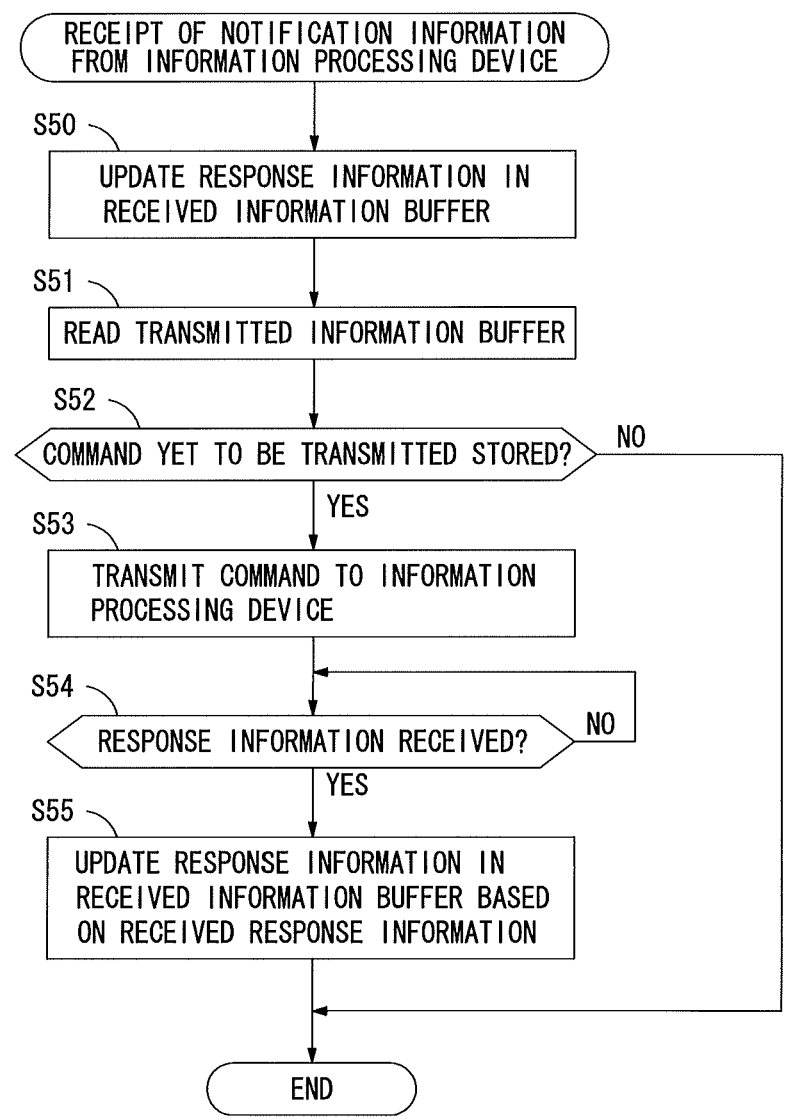
FIG. 13 is a flow diagram explaining an exemplary process sequence of the process executed when the virtually response part receives the notification information in response to the request for notification from the information processing device.

FIG. 13 is a flow diagram explaining an exemplary process sequence of the process executed when the virtually response part 34 receives the notification information in response to the request for notification from the information processing device 3. As shown in FIG. 13, the virtually response part 34 received the notification information in response to the request for notification from the information processing device 3 stores the received notification information in the received information buffer 42, thereby updating the response information in the received information buffer 42 (step S50). The virtually response part 34 reads the transmitted information buffer 41 (step S51), and determines whether or not the command yet to be transmitted is stored in the transmitted information buffer 41 (step S52). If the command yet to be transmitted is stored (when a result of step S52 is YES), the virtually response part 34 reads the command and transmits to the information processing device 3 (step S53). The virtually response part 34 thereafter is put into the waiting state to wait for the response information from the information processing device 3 (step S54). As receiving the response information from the information processing device 3 (when a result of step S54 is YES), the virtually response part 34 stores the received response information in the received information buffer 42, thereby updating the response information in the received information buffer 42 (step S55). If the command yet to be transmitted is determined not to be stored in the transmitted information buffer 41 as the result of the determination in step S52, the process executed at receipt of the notification information is completed without execution of process in steps S53 to S55.

As described above, in the present preferred embodiment, the application part 31 of the computer 2 outputs the variety of commands to the communication control device 32 to obtain the necessary information from the information processing device 3. The communication control device 32 controls data communication differently corresponding to the command requesting the data communication with the information processing device 3 received from the application part 31. As the command registered in the first command list 36a in the table information 36 is received from the application part 31, the communication control part 33 performs the virtual data communication with the virtually response part 34, thereby obtaining the virtual response information from the virtually response part 34. The communication control device 32 then outputs the obtained response information to the application part 31. When the command not registered in the first command list 36a in the table information 36 is received from the application part 31, the communication control device 32 performs the actual data communication with the information processing device 3. Through the actual data communication, the communication control device 32 obtains the actual response information from the information processing device 3, and outputs the obtained response information to the application part 31. The communication control device 32 of the present preferred embodiment does not perform unnecessary actual data communication with the information processing device 3. The communication control device 32 is allowed to output the virtual response information responding to the command to the application part 31 without the data communication with the information processing device 3. The application part 31 may be prevented from being stopped functioning, and the information processing device 3 is allowed to be in the power saving mode if it is in such mode.

The power supplied to the display unit 22 of the operational panel 21 is interrupted while the power supplied to the CPU 24a of the network communication module 24 is also interrupted as the information processing device 3 enters the advanced sleep mode ST3 in the present preferred embodiment. The information processing device 3 is capable of reducing the largest amount of consumed power while being in the advanced sleep mode ST3, therefore, it should continue being in the advanced sleep mode ST3 as long as possible. In order to continue the advanced sleep mode ST3 for a long time, the unnecessary command should not be transmitted to the information processing device 3 from the computer 2 placed externally. Every data communication between the computer 2 and the information processing device 3, however, should not be terminated as the complete termination involves a different problem. From this perspective, the communication control part 33 of the present preferred embodiment determines, based on the command lists 36a and 36b, whether or not the command received from the application part 31 is necessary to be transmitted to the information processing device 3. The command is transmitted to the information processing device 3 if it is necessary, whereas, is not transmitted to the information processing device 3 if it is unnecessary. When the command is not transmitted to the information processing device 3, the alternative task is executed by the virtually response part 34. The communication control device 32 of the present preferred embodiment transmits the command requiring immediate transmission including the job execution command and the job deletion command to the information processing device 3 at receipt when receiving the command from the application part 31. The information processing device 3 is allowed to execute the process corresponding to the received command in real time while continued being in the advanced sleep mode ST3 as long time as possible.

The table information 36 of the present preferred embodiment referred to by the communication control part 33 includes the information as to the alternative task executed by the virtually response part 34 to replace the operation by the information processing device 3. The information as to the alternative task is registered for each command registered in the first command list 36a. The communication control part 33 designates, based on the table information 36, the alternative task set for the command received from the application part 31, and causes the virtually response part 34 to execute the designated alternative task. The execution of the alternative task by the virtually response part 34 allows the communication control part 33 to obtain the virtual response information responding to the command from the application part 31 from the virtually response part 34. With each of the first execution of the alternative task and the second and subsequent execution of the alternative task, the virtually response part 34 is caused to execute the corresponding process by the communication control part 33. The process executed in the first execution of the alternative task is to obtain, through the actual data communication with the information processing device 3, the actual response information from the information processing device 3. The process executed in the second and subsequent execution of the alternative task is to output the response information responding to the command based on the response information previously obtained from the information processing device 3. In the present preferred embodiment, the communication control device 32 is not necessary to manage whether or not the information processing device 3 is in the power saving mode in real time. Therefore, the burden on the communication control device 32 is reduced.

As described above, as the command not requiring the actual data communication with the information processing device is received from the application part, the data communication with the information processing device is not performed. In this case, the virtual response information responding to the command is generated and output to the application part. The application part is prevented from being stopped functioning and the power saving mode on the information processing device is kept uninterrupted for a long time. When the command received from the application part requires the actual data communication with the information processing device, the actual data communication with the information processing device is performed. Thus, the process corresponding to the received command may be executed by the information processing device in real time.

(Modifications)

While the present preferred embodiment of the present invention has been described above, the present invention is not limited to the present preferred embodiment. Various modifications may be applied to the present invention.

In the present preferred embodiment described above, the table information 36 managed by the communication control part 33 includes the first command list 36a and the second command list 36b registered. The first command list 36a includes the command requesting virtual data communication with the virtually response part 34 while the second command list 36b includes the command requesting prompt data communication with the information processing device 3. The table information 36, however, may only include the first command list 36a registered. In this case, the command received from the application part 31 is specified as the command requesting prompt data communication with the information processing device 3 if the received command is not registered in the table information 36.

In the above-described present preferred embodiment, the four commands, the continuity check command, the device information obtaining command, the support command obtaining command and the search command are registered in the first command list 36a. All of those commands are not necessary to be registered, therefore, at least one of the commands may be registered. Also, the command not requiring the immediate transmission other than those commands may be registered in the first command list 36a.

In the present preferred embodiment described above, the function of the application part 31 and one of the communication control device 32 are realized in one computer 2. Each of those functions may be realized by the different computer. In such a case, those two computers are connected through the network 4. The computer realizing the function of the application part 31 may be configured to output the command received from the application part 31 to the computer realizing the function of the communication control device 32.

In the above-described present preferred embodiment, the information processing device 3 is shown to be a device such as MFPs. The device is not necessarily the device such as the units that support a variety of functions otherwise handled by separate equipment, such as copiers, printers, scanners, and facsimiles. To be more specific, the information processing device 3 may be a unit that supports single function such as the copier, printer, facsimile and scanner. The information processing device 3 may also be a unit supporting a function other than the copy function, the print function, the fax function, the scan function and the box function.

What is claimed is:

1. A communication control device capable of performing data communication with an information processing device connected through a network, for performing data communication corresponding to a command from an application part which requests data communication with said information processing device, comprising:
 a communication control part for performing data communication corresponding to the command from said application part and for outputting response information obtained through the data communication to said application part; and
 a virtually response part for storing information received from said information processing device and for generating virtual response information, containing information as to said information processing device, responding to the command from said application part, wherein
 said communication control part manages registration information including at least one command for requesting virtual data communication performed hypothetically with said virtually response part registered, obtains the virtual response information through the virtual data communication with said virtually response part and outputs the obtained virtual response information to said application part when the command received from said application part is registered in said registration information, while obtaining the response information through actual data communication with said information processing device and outputting the obtained response information to said application part when the command received from said application part is not registered in said registration information.

2. The communication control device according to claim 1, wherein
 said registration information is table information in which a command list including the command requesting the virtual data communication with said virtually response part registered, said registration information contains information as to an alternative task, to be executed by said virtually response part to replace operation by said information processing device, registered for each command included in said command list, and
 said communication control part designates, based on the command from said application part, the alternative task to be executed by said virtually response part and causes said virtually response part to execute said alternative task, thereby obtaining, from said virtually response part, the virtual response information responding to the command from said application part.

3. The communication control device according to claim 2, wherein
execution of said alternative task allows the actual data communication with said information processing device to be performed and the actual response information to be obtained from said information processing device for first execution, whereas the response information previously obtained from said information processing device is allowed to be used as a response for second and subsequent execution.

4. The communication control device according to claim 3, wherein said virtually response part, including a received information storage part for storing therein the response information obtained from said information processing device, reads the response information in said received information storage part and generates the virtual response information by the execution of said alternative task.

5. The communication control device according to claim 4, wherein
said virtually response part performs, in the first execution of said alternative task, the actual data communication with said information processing device, thereby storing the response information obtained from said information processing device in said received information storage part and sending a request for notification to request notifying change in a state of said information processing device if any change is occurred in the state.

6. The communication control device according to claim 5, wherein
said virtually response part stores, as receiving information to notify the change in the state of said information processing device in response to said request, the information to notify the change in said received information storage part, and thereafter reads the information to notify the change and generates the virtual response information at the execution of said alternative task.

7. The communication control device according to claim 4, wherein
said virtually response part further includes a transmitted information storage part for storing therein the command when the virtual data communication corresponding to the command from said application part is performed with said communication control part,
as receiving the information received from said information processing device, said virtually response part stores the received information in said received information storage part, and performs the actual data communication with said information processing device based on the stored command in said transmitted information storage part, thereby obtaining the response information responding to the stored command from said information processing device and storing the obtained response information in said received information storage part.

8. The communication control device according to claim 1, wherein
said registration information includes at least one command, output from said application part on a regular or irregular basis to manage the state of said information processing device, registered.

9. The communication control device according to claim 1, wherein
said communication control part, having power saving setting management information, in which whether or not said information processing device enters a power saving mode is set, stored therein, performs the virtual data communication corresponding to the command from said application part with said virtually response part when the power saving setting management information shows that said information processing device is set to enter the power saving mode, while performing the actual data communication with said information processing device in response to the command received from said application part when said information processing device is not set to enter the power saving mode.

10. A communication control method for controlling communication corresponding to a command from an application part which requests data communication with an information processing device connected through a network, the method comprising the steps of:
(a) receiving, from said application part, the command requesting the data communication with said information processing device;
(b) determining whether or not a command defined to perform virtual data communication with a predetermined virtually response part included in a command list is received from said application part; and
(c) obtaining, through the virtual data communication with said virtually response part, virtual response information from said virtually response part and outputting the obtained virtual response information to said application part when the command received from said application part is included in said command list, while obtaining, through actual data communication with said information processing device, response information from said information processing device and outputting the obtained response information to said application part when the command received from said application part is not included in said command list.

11. A non-transitory computer readable medium on which a program is recorded, said program executed by a computer which performs data communication with an information processing device connected through a network, said program causing said computer to execute the steps of:
(a) receiving, from an application part, a command requesting the data communication with said information processing device;
(b) determining whether or not a command defined to perform virtual data communication with a predetermined virtually response part included in a command list is received from said application part; and
(c) obtaining, through the virtual data communication with said virtually response part, virtual response information from said virtually response part and outputting the obtained virtual response information to said application part when the command received from said application part is included in said command list, while obtaining, through actual data communication with said information processing device, response information from said information processing device and outputting the obtained response information to said application part when the command received from said application part is not included in said command list.

12. A non-transitory computer readable medium on which a program is recorded, said program executed by a computer which performs data communication with an information processing device connected through a network, said program causing said computer to operate as a system comprising:
a communication control part for performing data communication corresponding to a command from an application part, which requests data communication with said information processing device and for outputting response information obtained through the data communication to said application part; and a virtually response part for storing information received from said information processing device and for generating virtual response information, containing information as to said information processing device, responding to the command from said application part, wherein said communication control part manages registration information including at least one command for requesting virtual data communication performed hypothetically with said virtually response part registered, obtains the virtual response information through the virtual data communication with said virtually response part and outputs the obtained virtual response information to said application part when the command received from said application part is registered in said registration information, while obtaining the response information through actual data communication with said information processing device and outputting the obtained response information to said application part when the command received from said application part is not registered in said registration information.

13. The non-transitory computer readable medium according to claim 12, wherein said registration information is table information, in which a command list including the command requesting the virtual data communication with said virtually response part, registered, said registration information contains information as to an alternative task, to be executed by said virtually response part to replace operation by said information processing device, registered for each command included in said command list, and said communication control part designates, based on the command from said application part, the alternative task to be executed by said virtually response part and causes said virtually response part to execute said alternative task, thereby obtaining, from said virtually response part, the virtual response information responding to the command from said application part.

14. The non-transitory computer readable medium according to claim 13, wherein execution of said alternative task allows the actual data communication with said information processing device to be performed and the actual response information to be obtained from said information processing device for first execution, whereas the response information previously obtained from said information processing device is allowed to be used as a response for second and subsequent execution.

15. The non-transitory computer readable medium according to claim 14, wherein said virtually response part for storing the response information obtained from said information processing device in a predetermined received information storage part, reads the response information in said received information storage part and generates the virtual response information by the execution of said alternative task.

16. The non-transitory computer readable medium according to claim 15, wherein said virtually response part performs, in the first execution of said alternative task, the actual data communication with said information processing device, thereby storing the response information obtained from said information processing device in said received information storage part and sending a request for notification to request notifying change in a state of said information processing device if any change is occurred in the state.

17. The non-transitory computer readable medium according to claim 16, wherein said virtually response part stores, as receiving information to notify the change in the state of said information processing device in response to said request, the information to notify the change in said received information storage part, and thereafter reads the information to notify the change and generates the virtual response information at the execution of said alternative task.

18. The non-transitory computer readable medium according to claim 15, wherein said virtually response part stores the command in a predetermined transmitted information storage part when the virtual data communication corresponding to the command from said application part is performed with said communication control part, as receiving the information received from said information processing device, said virtually response part stores the received information in said received information storage part, and performs the actual data communication with said information processing device based on the stored command in said transmitted information storage part, thereby obtaining the response information responding to the stored command from said information processing device and storing the obtained response information in said received information storage part.

19. The non-transitory computer readable medium according to claim 12, wherein said registration information includes at least one command, output from said application part on a regular or irregular basis to manage the state of said information processing device, registered.

20. The non-transitory computer readable medium according to claim 12, wherein said communication control part, having power saving setting management information, in which whether or not said information processing device enters a power saving mode is set, stored therein, performs the virtual data communication corresponding to the command from said application part with said virtually response part when the power saving setting management information shows that said information processing device is set to enter the power saving mode, while performing the actual data communication with said information processing device in response to the command received from said application part when said information processing device is not set to enter the power saving mode.

* * * * *